(12) United States Patent
Suko et al.

(10) Patent No.: US 11,809,854 B2
(45) Date of Patent: Nov. 7, 2023

(54) SOFTWARE UPDATING METHOD, SOFTWARE UPDATING SYSTEM AND SOFTWARE UPDATING PROGRAM

(71) Applicant: DAIKIN INDUSTRIES, LTD., Osaka (JP)

(72) Inventors: Kazuo Suko, Osaka (JP); Yasuyuki Aisaka, Osaka (JP); Tsutomu Iura, Osaka (JP); Mieharu Tokuda, Osaka (JP); Kazuteru Matsui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/997,160

(22) PCT Filed: Apr. 26, 2021

(86) PCT No.: PCT/JP2021/016631
§ 371 (c)(1),
(2) Date: Oct. 26, 2022

(87) PCT Pub. No.: WO2021/221012
PCT Pub. Date: Nov. 4, 2021

(65) Prior Publication Data
US 2023/0131475 A1    Apr. 27, 2023

(30) Foreign Application Priority Data

Apr. 30, 2020   (JP) ................................. 2020-080709

(51) Int. Cl.
*G06F 8/65* (2018.01)
(52) U.S. Cl.
CPC ..................................... *G06F 8/65* (2013.01)
(58) Field of Classification Search
USPC .......................................................... 717/170
See application file for complete search history.

(56) References Cited

U.S. PATENT DOCUMENTS

| 8,594,850 B1 * | 11/2013 | Gourlay | .................... G06F 8/61 |
| | | | 165/203 |
| 2003/0033392 A1 * | 2/2003 | Nakamura | ............... F24F 11/62 |
| | | | 700/1 |

(Continued)

FOREIGN PATENT DOCUMENTS

| CN | 109445819 | 3/2019 |
| JP | 2017-157004 | 9/2017 |

(Continued)

OTHER PUBLICATIONS

International Preliminary Report on Patentability for PCT/JP2021/016631 dated Nov. 10, 2022.

(Continued)

*Primary Examiner* — Qing Chen
*Assistant Examiner* — Clint Thatcher
(74) *Attorney, Agent, or Firm* — IPUSA, PLLC

(57) ABSTRACT

Provided is technology to implement an updating process according to a situation of each equipment when software is collectively updated with respect to a plurality of equipment items constituting an equipment system. With respect to a software updating method for a plurality of equipment items constituting the equipment system, the software updating method includes acquiring information indicating an operation state of at least respective equipment to be updated among the plurality of equipment items, acquiring information indicating a reception state of updated software of the respective equipment, determining whether to perform switching to the updated software by the respective equipment, and instructing switching to the updated software based on a result of a determination. The determining determines that the switching to the updated software by the respective equipment is not to be performed in a case where (Continued)

equipment in operation and from which reception is incomplete exists.

8 Claims, 17 Drawing Sheets

(56) References Cited

U.S. PATENT DOCUMENTS

| | | | | |
|---|---|---|---|---|
| 2004/0243994 | A1* | 12/2004 | Nasu | G06F 8/65 |
| | | | | 717/171 |
| 2014/0173581 | A1* | 6/2014 | Grinberg | G06F 8/654 |
| | | | | 717/172 |
| 2014/0215450 | A1* | 7/2014 | Salisbury | G06F 8/65 |
| | | | | 717/172 |
| 2016/0025370 | A1 | 1/2016 | Sugimura | |
| 2018/0253295 | A1* | 9/2018 | Kröselberg | G06F 8/65 |
| 2020/0201621 | A1* | 6/2020 | Buecherl | G06F 8/65 |
| 2020/0249646 | A1* | 8/2020 | Gupta | G06F 8/65 |
| 2021/0182050 | A1 | 6/2021 | Tsuji | |
| 2021/0263724 | A1 | 8/2021 | Ye | |

FOREIGN PATENT DOCUMENTS

| | | |
|---|---|---|
| JP | 2019-143896 | 8/2019 |
| WO | 2014/181472 | 11/2014 |
| WO | 2017/175533 | 10/2017 |
| WO | 2020/053928 | 3/2020 |

OTHER PUBLICATIONS

International Search Report for PCT/JP2021/016631 dated Aug. 3, 2021.
Extended European search report for EP21796058.2 dated Sep. 13, 2023.

* cited by examiner

FIG.2
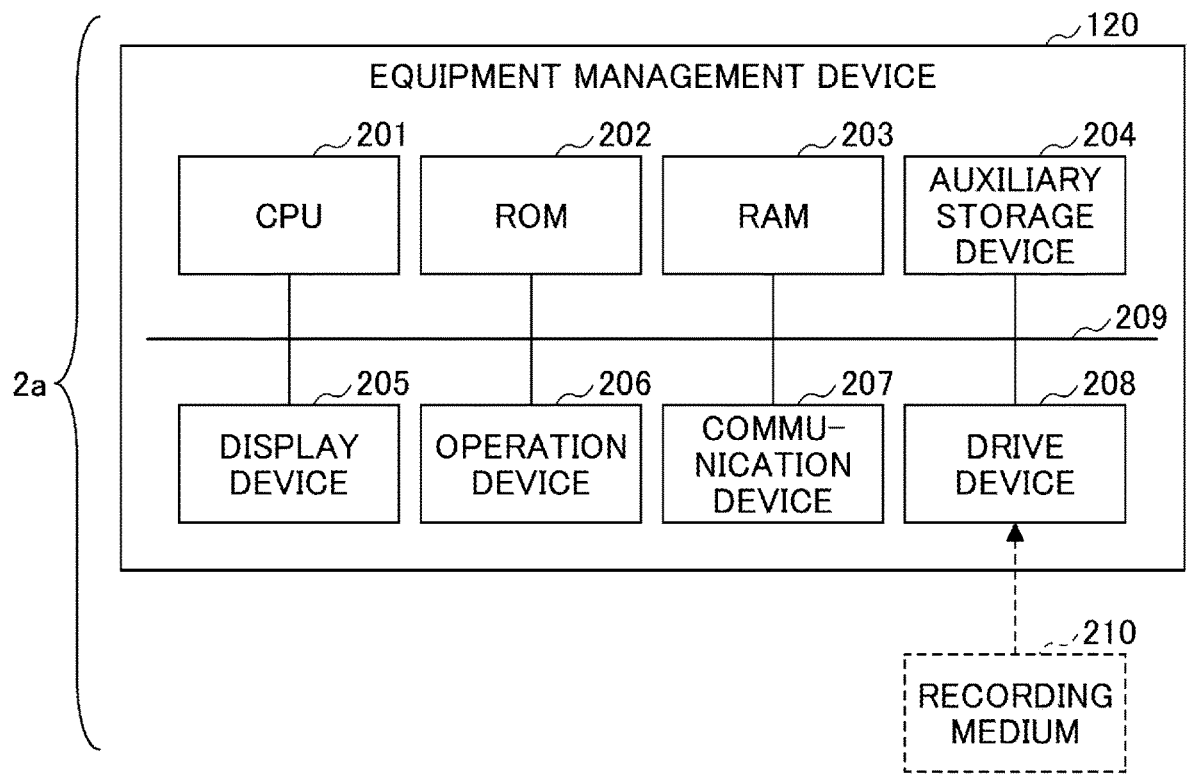
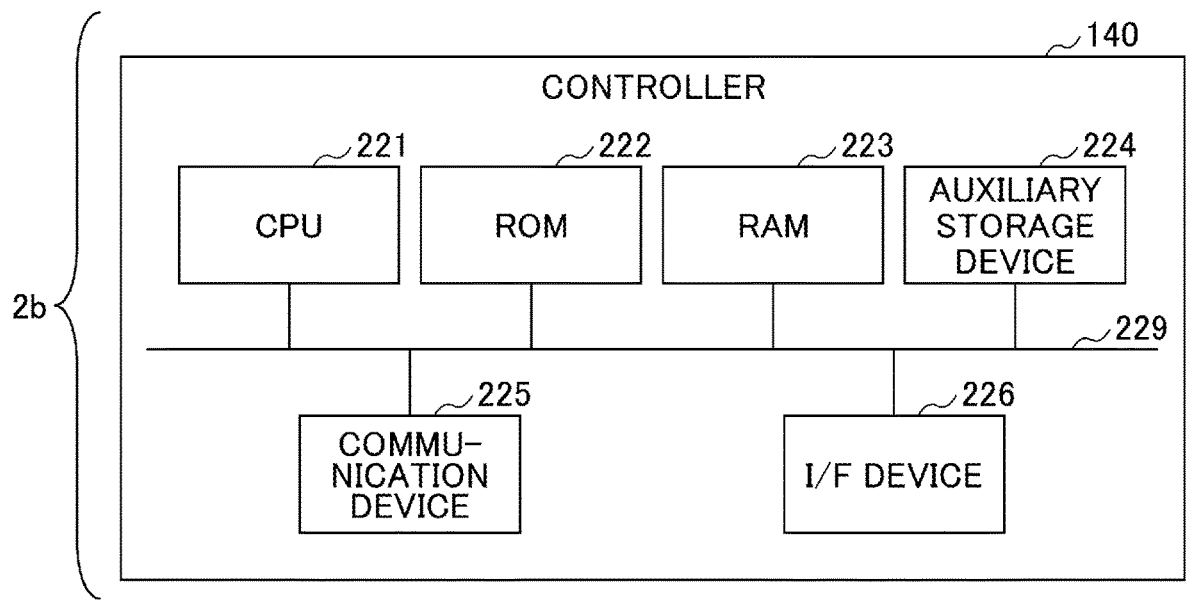

FIG.3A

EQUIPMENT LIST 300

| REFRIGERANT SYSTEM | EQUIPMENT ID | EQUIPMENT NAME | MODEL NAME | OPERATION STATE OR RECEPTION STATE |
|---|---|---|---|---|
| SYSTEM 1 | ID1 | AIR CONDITIONING EQUIPMENT 1 | GAI280 | |
| | ID1_1 | AIR CONDITIONING EQUIPMENT 1_1 | NAI_TEN140 | USER SETTING INFORMATION (UPDATE PROHIBITION INSTRUCTION) |
| | ID1_2 | AIR CONDITIONING EQUIPMENT 1_2 | | |
| | ID1_3 | AIR CONDITIONING EQUIPMENT 1_3 | | RECEPTION STATE (COMMUNICATION ERROR HAS CONTINUED FOR PREDETERMINED TIME) |
| | ... | ... | ... | ... |
| | ID1_n | AIR CONDITIONING EQUIPMENT 1_n | NAI_TEN140 | |
| SYSTEM 2 | ID2 | AIR CONDITIONING EQUIPMENT 2 | GAI560 | |
| | ID2_1 | AIR CONDITIONING EQUIPMENT 2_1 | | |
| | ID2_2 | AIR CONDITIONING EQUIPMENT 2_2 | NAI_DAK140 | |
| | ID2_3 | AIR CONDITIONING EQUIPMENT 2_3 | | OPERATION STATE (HAS BEEN TURNED OFF FOR A LONG PERIOD OF TIME) |
| | ... | ... | ... | ... |
| | ID2_m | AIR CONDITIONING EQUIPMENT 2_m | NAI_DAK140 | |

FIG.3B

| NON-TARGET EQUIPMENT LIST | | | |
|---|---|---|---|
| REFRIGERANT SYSTEM | EQUIPMENT ID | EQUIPMENT NAME | 310 |
| SYSTEM 1 | ID1_2 | AIR CONDITIONING EQUIPMENT 1_2 | |
| | ID1_3 | AIR CONDITIONING EQUIPMENT 1_3 | |
| SYSTEM 2 | ID2_3 | AIR CONDITIONING EQUIPMENT 2_3 | |

FIG.4

| VERSION INFORMATION | | | | 400 |
|---|---|---|---|---|
| REFRIGERANT SYSTEM | EQUIPMENT ID | EQUIPMENT NAME | MODEL NAME | VERSION |
| SYSTEM 1 | ID1 | AIR CONDITIONING EQUIPMENT 1 | GAI280 | Ver2 |
| | ID1_1 | AIR CONDITIONING EQUIPMENT 1_1 | NAI_TEN140 | Ver1 |
| | ID1_2 | AIR CONDITIONING EQUIPMENT 1_2 | | Ver2 |
| | ID1_3 | AIR CONDITIONING EQUIPMENT 1_3 | | Ver2 |
| | ⋮ | ⋮ | ⋮ | ⋮ |
| | ID1_n | AIR CONDITIONING EQUIPMENT 1_n | NAI_TEN140 | Ver2 |
| SYSTEM 2 | ID2 | AIR CONDITIONING EQUIPMENT 2 | GAI560 | Ver2 |
| | ID2_1 | AIR CONDITIONING EQUIPMENT 2_1 | NAI_DAK140 | Ver2 |
| | ID2_2 | AIR CONDITIONING EQUIPMENT 2_2 | | Ver2 |
| | ID2_3 | AIR CONDITIONING EQUIPMENT 2_3 | | Ver1 |
| | ⋮ | ⋮ | ⋮ | ⋮ |
| | ID2_m | AIR CONDITIONING EQUIPMENT 2_m | NAI_DAK140 | Ver2 |

SOFTWARE UPDATING METHOD, SOFTWARE UPDATING SYSTEM AND SOFTWARE UPDATING PROGRAM

TECHNICAL FIELD

The present disclosure relates to a software updating method, a software updating system and a software updating program.

BACKGROUND ART

Generally, in an equipment system including multiple equipment, software is collectively updated so that software of the same version is executed among the equipment.

In a case of collectively updating software, a situation is assumed in which the software update will not succeed in some equipment due to a temporarily occurring situation (for example, communication error or the like). On the other hand, for example, in Patent Literature 1 below, when a software update is interrupted in some devices, a configuration is proposed in which the software update is continuously performed for the devices until the software update is completed.

CITATION LIST

Patent Literature

[PTL 1]
Japanese Laid-Open Patent Publication No. 2017-157004

SUMMARY OF THE INVENTION

Problem to be Solved by the Invention

However, depending on the type of equipment system, for example, a situation in which some equipment is in a shutdown state for a long period of time is conceivable. Specifically, in a case of an air conditioning system, there may be a situation in which indoor units in the same system are arranged across multiple tenants, and the indoor units may be turned off for a long time in some unoccupied tenants.

Even under such a situation, if the system is configured to continuously update the software of all indoor units to be updated until the update succeeds, as a result, the software of all indoor units will not be updated for a long period of time.

The present disclosure provides a software update method, a software updating system, and a software updating program that realize update processing in accordance with a situation of each equipment when collectively updating software for multiple equipment constituting an equipment system.

Means to Solve the Problem

A first aspect of the present disclosure is related to a software updating method for a plurality of equipment items constituting an equipment system, the software updating method comprising acquiring information indicating an operation state of at least respective equipment to be updated among the plurality of equipment items, acquiring information indicating a reception state of updated software of the respective equipment, determining whether to perform switching to the updated software by the respective equipment, and instructing switching to the updated software based on a result of the determining. The determining determines that the switching to the updated software by the respective equipment is not to be performed in a case where equipment that is in operation and from which reception is incomplete exists.

According to the first aspect of the present disclosure, switching to the updated software by the respective equipment is not performed in a situation in which there is equipment that is in operation (not listed in a non-target equipment list) and for which reception is incomplete (i.e., a reception completion notification has not been received). As a result, it is possible to avoid a situation where different versions of software are executed between the equipment in operation.

That is, according to the first aspect of the disclosure, when software is collectively updated for the plurality of equipment constituting the equipment system, a software updating method that implements an updating process according to the situation of each equipment can be provided.

Further, a second aspect of the present disclosure is the software updating method according to the first aspect, in a case where equipment that is not in operation exists, the determining determines that the switching to the updated software is to be performed by another equipment other than the equipment that is not in operation, among the respective equipment.

According to the second aspect of the present disclosure, in a situation where there is equipment that is not in operation (listed in the non-target equipment list), switching to the updated software is performed for equipment (equipment in operation) other than the equipment that is not in operation. As a result, it is possible to avoid a situation in which software is not updated for a long period of time with respect to equipment (i.e., equipment in operation) other than the equipment that is not in operation. Further, the version of software can be made the same between equipment (i.e., equipment in operation) other than the equipment that is not in operation.

That is, according to the second aspect of the disclosure, when software is collectively updated for the plurality of equipment constituting the equipment system, a software updating method that implements an updating process according to the situation of each equipment can be provided.

A third aspect of the present disclosure is the software updating method according to the first or second aspect, wherein the information indicating the operation state of the respective equipment includes at least one of user setting information and information indicating a driving state of equipment.

According to the third aspect of the present disclosure, it is possible to input user setting information (i.e., update prohibition instruction, prohibition release instruction) as information indicating the operation state of the respective equipment. Alternatively, according to the third aspect of the present disclosure, as the information indicating the operation state of the respective equipment, it is possible to input information indicating the operation state of the equipment (for example, information indicating that the power supply is turned off for a long period of time, or information indicating that the power supply of the equipment which has been turned off for a long period of time is turned ON). As a result, it is possible to indicate an appropriate equipment as equipment that is not in operation.

Further, a fourth aspect of the present disclosure is the software updating method according to the second or third aspect further comprising acquiring, in a case where equipment that is not in operation becomes in operation, a current version of software of the equipment, comparing the acquired current version with a version of the updated software, transmitting, to the equipment that has become in operation, the updated software, in a case where the acquired current version satisfies a predetermined condition as a result of the comparing, and instructing switching to the updated software after the equipment that has become in operation successfully received the updated software.

According to the fourth aspect of the present disclosure, in a case where equipment that is not in operation (i.e., listed in the non-target equipment list) becomes in operation (i.e., in a case where the equipment is deleted from the non-target equipment list), switching to the updated software is performed for the equipment. As a result, it is possible to avoid a situation in which different versions of software are executed between equipment in operation.

Further, a fifth aspect of the present disclosure is the software updating method according to any one of the first to fourth aspects further comprising retransmitting the updated software to equipment from which reception has failed, among the equipment in operation and from which reception is incomplete.

According to the fifth aspect of the present disclosure, even in a case where there is equipment that is in operation (i.e., not listed in the non-target equipment list) and from which reception has failed (i.e., communication error), if the reception failure is resolved within a certain period of time, switching to the updated software is performed. As a result, it is possible to avoid a situation in which different versions of software are executed between equipment in operation.

Further, a sixth aspect of the present disclosure is the software updating method according to the fifth aspect, wherein the information indicating the reception state of the updated software of the respective equipment includes information indicating that a reception failure state has continued for a predetermined period of time with respect to equipment that is in operation and from which reception has failed.

According to the sixth aspect of the present disclosure, when a reception failure state continues for a certain period of time, the equipment that is in operation and from which reception has failed is treated as equipment that is not in operation, and the switching to updated software is performed for other equipment in operation. As a result, it is possible to avoid a situation in which software is not updated for a long period of time with respect to the equipment (i.e., equipment in operation) other than the equipment that is not in operation.

A seventh aspect of the present disclosure is the software updating method according to any one of the first to sixth aspects, wherein the equipment system is an air conditioning system including an outdoor unit and an indoor unit.

An eighth aspect of the present disclosure is related to a software updating system, including a plurality of equipment constituting an equipment system, a controller that controls the plurality of equipment, and a management device communicably connected to the controller, for updating software of the plurality of equipment constituting the equipment system, the software updating system comprising a first acquisition unit configured to acquire information indicating an operation state of at least respective equipment to be updated among the plurality of equipment, a second acquisition unit configured to acquire information indicating a reception state of updated software of the respective equipment, a determination unit configured to determine whether to perform switching to the updated software by the respective equipment, and an instruction unit configured to instruct switching to the updated software based on a result of the determination. The determination unit determines that the switching to the updated software by the respective equipment is not to be performed in a case where equipment that is in operation and from which reception is incomplete exists.

According to the eighth aspect of the present disclosure, switching to the updated software by the respective equipment is not performed in a situation in which there is equipment that is in operation (not listed in a non-target equipment list) and for which reception is incomplete (i.e., a reception completion notification has not been received). As a result, it is possible to avoid a situation where different versions of software are executed between the equipment in operation.

That is, according to the eighth aspect of the disclosure, when software is collectively updated for the plurality of equipment constituting the equipment system, a software updating system that implements an updating process according to the situation of each equipment can be provided.

A ninth aspect of the present disclosure is related to a software updating system, including a plurality of equipment constituting an equipment system and a management device that manages the plurality of equipment, for updating software of the plurality of equipment constituting the equipment system, the software updating system comprising a first acquisition unit configured to acquire information indicating an operation state of at least respective equipment to be updated among the plurality of equipment, a second acquisition unit configured to acquire information indicating a reception state of updated software of the respective equipment, a determination unit configured to determine whether to perform switching to the updated software by the respective equipment, and an instruction unit configured to instruct switching to the updated software based on a result of the determination. The determination unit determines that the switching to the updated software by the respective equipment is not to be performed in a case where equipment that is in operation and from which reception is incomplete exists.

According to the ninth aspect of the present disclosure, switching to the updated software by the respective equipment is not performed in a situation in which there is equipment that is in operation (not listed in a non-target equipment list) and for which reception is incomplete (i.e., a reception completion notification has not been received). As a result, it is possible to avoid a situation where different versions of software are executed between the equipment in operation.

That is, according to the ninth aspect of the disclosure, when software is collectively updated for the plurality of equipment constituting the equipment system, a software updating system that implements an updating process according to the situation of each equipment can be provided.

A tenth aspect of the present disclosure is related to a software updating program for causing a computer of an apparatus to update software of a plurality of equipment constituting an equipment system, the software updating program causing the computer to execute acquiring information indicating an operation state of at least respective equipment to be updated among the plurality of equipment, acquiring information indicating a reception state of updated software of the respective equipment, determining whether to perform switching to the updated software by the respective equipment, and instructing switching to the updated software based on a result of the determining. The determining determines that the switching to the updated software by the respective equipment is not to be performed in a case where equipment that is in operation and from which reception is incomplete exists.

According to the tenth aspect of the present disclosure, switching to the updated software by the respective equipment is not performed in a situation in which there is equipment that is in operation (not listed in a non-target equipment list) and for which reception is incomplete (i.e., a reception completion notification has not been received). As a result, it is possible to avoid a situation where different versions of software are executed between the equipment in operation.

That is, according to the tenth aspect of the disclosure, when software is collectively updated for the plurality of equipment constituting the equipment system, a software updating program that implements an updating process according to the situation of each equipment can be provided.

BRIEF DESCRIPTION OF DRAWINGS

FIG. 2 is a diagram illustrating an example of a hardware configuration of an equipment management device and a controller;

FIG. 3A is a first diagram illustrating an example of an equipment list and a non-target equipment list;

FIG. 3B is a second diagram illustrating an example of an equipment list and a non-target equipment list;

FIG. 4 is a diagram illustrating an example of version information;

MODE FOR CARRYING OUT THE INVENTION

Figure 1:
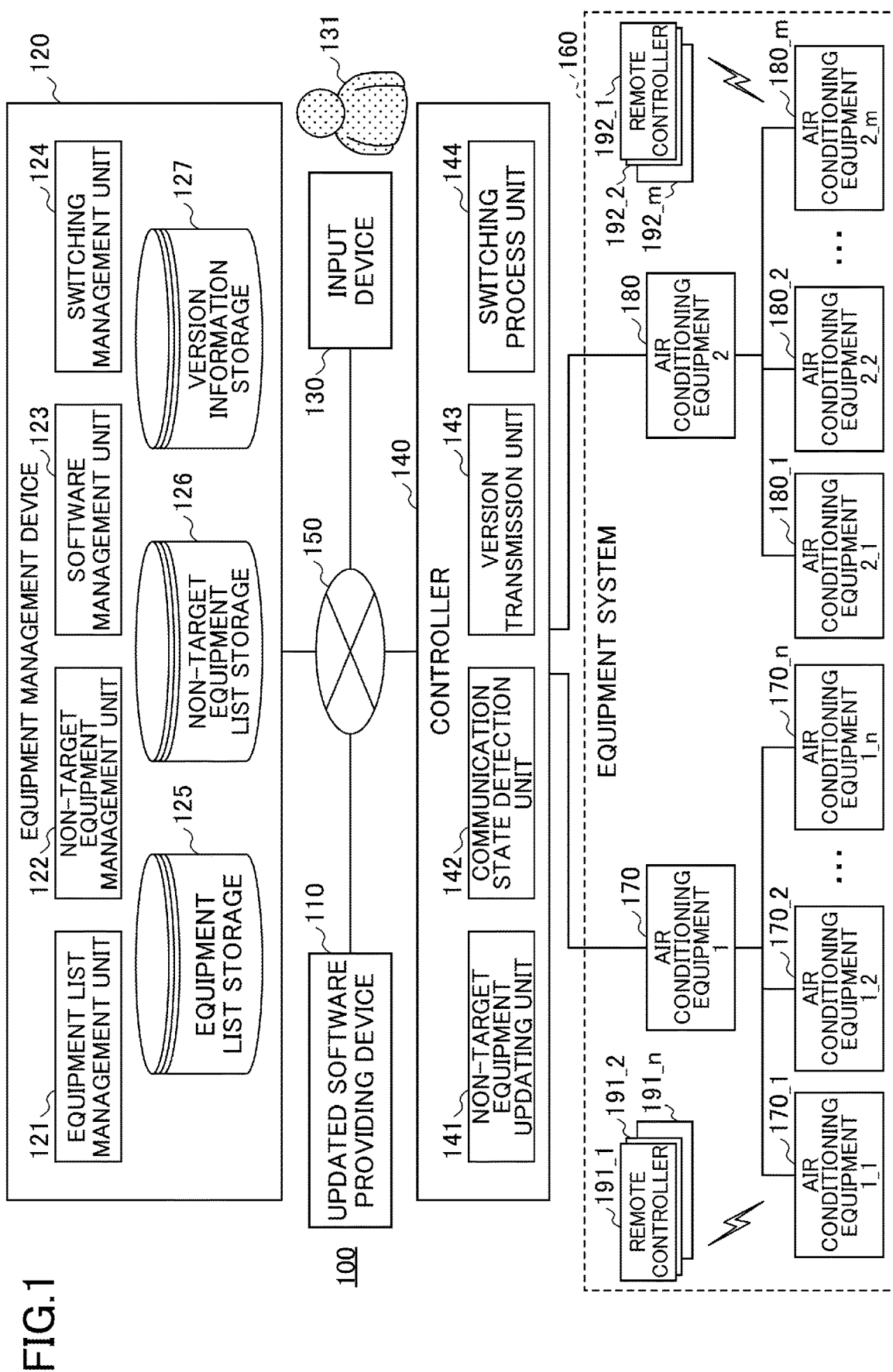
FIG. 1 is a diagram illustrating an example of an overall configuration of a software updating system.

Hereinafter, embodiments will be described with reference to the accompanying drawings. Note that, in the present specification and the drawings, constituent elements having substantially the same functional configuration are denoted by the same reference numerals, and redundant description is omitted.

First Embodiment

<System Configuration of Software Updating System>

First, an overall configuration of a software updating system including an equipment system whose software is to be updated will be described. FIG. 1 is a diagram illustrating an example of an overall configuration of the software updating system. As illustrated in FIG. 1, a software updating system 100 includes an updated software providing device 110, an equipment management device 120, an input device 130, a controller 140, and an equipment system 160.

In the software updating system 100, the equipment management device 120 is communicably connected to the updated software providing device 110, the input device 130, and the controller 140 via the network 150. The controller 140 is communicably connected to a plurality of equipment constituting the equipment system 160 under a predetermined communication protocol.

In the present embodiment, the equipment system 160 is an air conditioning system, and a plurality of equipment constituting the equipment system 160 is air conditioning equipment. However, the equipment system 160 whose software is to be updated is not limited to the air conditioning system, and may be an equipment system other than the air conditioning system.

New software or updated software obtained by updating existing software is registered in the updated software providing device 110. The new software or the updated software registered in the updated software providing device 110 is provided to the equipment management device 120.

The equipment management device 120 is configured by, for example, a cloud device. The equipment management device 120 manages information indicating an operation state of the plurality of air conditioning equipment constituting the equipment system 160, information indicating a reception state of updated software in each air conditioning equipment, version information of software in the plurality of air conditioning equipment, and the like.

Further, when the updated software is registered in the updated software providing device 110, the equipment management device 120 operates in cooperation with the controller 140 such that a switching process to the updated software is performed in the corresponding air conditioning equipment.

Specifically, an equipment management program is installed in the equipment management device 120, and by executing the program, the equipment management device 120 functions as an equipment list management unit 121 and a non-target equipment management unit 122. Furthermore, by executing the equipment management program, the equipment management device 120 functions as a software management unit 123 and a switching management unit 124.

The equipment list management unit 121 is an example of a first acquisition unit and a second acquisition unit, and manages an equipment list (an equipment list in which a connected refrigerant system, an equipment identifier (ID), an equipment name, and a model name are registered) with respect to the entire air conditioning equipment constituting the equipment system 160.

Further, the equipment list management unit 121 acquires information indicating the operation state of each air conditioning equipment registered in the equipment list and information indicating the reception state of the updated software in each air conditioning equipment. The equipment list management unit 121 newly records the acquired information indicating the operation state or information indicating the reception state in the equipment list, or deletes the information indicating the operation state or information indicating the reception state already recorded in the equipment list. Note that an equipment list managed by the equipment list management unit 121 is stored in an equipment list storage 125.

The non-target equipment management unit 122 manages a non-target equipment list (a non-target equipment list in which a connected refrigerant system, an equipment ID, and an equipment name are registered) indicating air conditioning equipment that are not in operation (air conditioning equipment in non-operation) among the plurality of air conditioning equipment constituting the equipment system 160. The non-target equipment management unit 122 specifies air conditioning equipment that is not in operation (air conditioning equipment that is in non-operation) based on the information indicating the operation state of each air conditioning equipment and the information indicating the reception state of the updated software in each air conditioning equipment, which are recorded in the equipment list. Further, the non-target equipment management unit 122 generates or changes the non-target equipment list based on the specified air conditioning equipment that is not in operation. The non-target equipment list managed by the non-target equipment management unit 122 is stored in a non-target equipment list storage 126.

The software management unit 123 manages a version of software currently included in each air conditioning equipment constituting the equipment system 160. The software management unit 123 updates version information stored in a version information storage 127 when the version of the software included in each air conditioning equipment is updated (when the software is switched to the updated software). Further, the software management unit 123 updates the version information, for example, when the power supply of the air conditioning device that has been turned off for a long period of time is turned on, or when a communication state of the air conditioning equipment that has continued to be abnormal for a certain period of time or more becomes normal.

The switching management unit 124 operates when the updated software is registered in the updated software providing device 110.

Specifically, the switching management unit 124 specifies a "target equipment" whose software is to be updated based on the model name of each air conditioning equipment registered in the equipment list. Further, the switching management unit 124 inquires of the input device 130 about whether the software updating is permitted, and transmits the specified target equipment to the controller 140 when it is determined that the software updating process is permitted based on the response to the inquiry. The switching management unit 124 specifies a target equipment for each refrigerant system and transmits the specified target equipment to the controller 140.

Further, the switching management unit 124 transmits the updated software provided by the updated software providing device 110 to the controller 140.

Further, the switching management unit 124 transmits the non-target equipment list to the controller 140. Further, when receiving a switching preparation completion notification from the controller 140, the switching management unit 124 transmits a switching instruction to the controller 140.

The input device 130 is used when an administrator 131 remotely inputs information indicating the driving state of each of the plurality of air conditioning equipment constituting the equipment system 160. Further, the input device 130 is used when the administrator 131 inputs the response to the inquiry about whether the software updating process is permitted.

Note that the information indicating the driving state input by the administrator 131 includes, for example, information indicating that the power supply of the corresponding air conditioning equipment is turned off for a long period of time, information indicating that the power supply of the air conditioning equipment that has been turned off for a long period of time is turned on, or the like. The information indicating the driving state input by the administrator 131 is transmitted to the equipment management device 120. Accordingly, the equipment list management unit 121 of the equipment management device 120 newly records the information indicating the driving state in the equipment list as information indicating the operation state of the air conditioning equipment. Alternatively, the equipment list management unit 121 of the equipment management device 120 deletes, from the equipment list, corresponding information indicating the driving state that has already been recorded in the equipment list as information indicating the operation state of the air conditioning equipment.

When the information indicating the operation state is newly recorded in the equipment list (or the information indicating the operation state is deleted from the equipment list), the non-target equipment management unit 122 changes the non-target equipment list.

The controller 140 is configured by an edge device, for example, and relays information transmitted and received between the equipment management device 120 and the equipment system 160.

Specifically, a control program is installed in the controller 140, and by executing the control program, the controller 140 functions as a non-target equipment updating unit 141 and a communication state detection unit 142. Furthermore, by executing the control program, the controller 140 functions as a version transmission unit 143 and a switching process unit 144.

The non-target equipment updating unit 141 transmits user setting information (update prohibition instruction, prohibition release instruction) set by the user for any one of the air conditioning equipment to the equipment management device 120 via any one of remote controllers 191_1 to 192_m. Accordingly, the equipment list management unit 121 of the equipment management device 120 newly records the user setting information in the equipment list as information indicating the operation state, or deletes the corresponding user setting information already recorded in the equipment list from the equipment list. When the information indicating the operation state is newly recorded in the equipment list (or the information indicating the operation state is deleted from the equipment list), the non-target equipment management unit 122 changes the non-target equipment list.

The communication state detection unit 142 determines a communication state between each air conditioning equipment constituting the equipment system 160 and the controller 140. For example, when the updated software is transmitted to the "target equipment in operation" among the air conditioning equipment constituting the equipment system 160, the communication state detection unit 142 receives a reception completion notification from the target equipment in operation.

The target equipment in operation refers to an air conditioning equipment obtained by excluding air conditioning equipment registered in the non-target equipment list (air conditioning devices in non-operation) from target equipment whose software is to be updated, and is specified for each refrigerant system. Further, among the target equipment in operation, a target equipment that has not received the reception completion notification (i.e., a target equipment that has not received the updated software) includes both "a target equipment that has not received the reception completion notification because the updated software has not been transmitted" and "a target equipment for which the updated software has already been sent but the updated software could not be received due to reception failure (for example, communication error) and the reception completion notification has not been received."

Further, when the reception completion notification is not received from any of the target equipment among the target equipment in operation for which the updated software has already been transmitted, the communication state detection unit 142 determines that the communication error has occurred with respect to the target equipment. When the communication error has continued for a certain period of time (for example, three days), the communication state detection unit 142 transmits information indicating that the communication error has continued for the predetermined time or more in the target equipment to the equipment management device 120.

As a result, the equipment list management unit 121 of the equipment management device 120 records the information indicating that the communication error has continued for a certain period of time in the equipment list as information indicating the reception state of the updated software in the air conditioning equipment. Further, when information indicating the reception state is newly recorded in the equipment list, the non-target equipment management unit 122 changes the non-target equipment list.

In a case where an air conditioning equipment that has been turned off for a long period of time is turned on or in a case where the communication state of the air conditioning equipment in which the communication error has continued for the predetermined time or more becomes normal, the version transmission unit 143 acquires the equipment ID of the relevant air conditioning equipment and a version of software currently included in the relevant air conditioning equipment, among the plurality of air conditioning equipment included in the equipment system 160.

Further, the version transmission unit 143 transmits the acquired equipment ID of the air conditioning equipment and the version of the software currently included in the air conditioning equipment to the equipment management device 120. Accordingly, the software management unit 123 of the equipment management device 120 updates the version of the air conditioning equipment.

When the air conditioning equipment that has been turned off for a long period of time is turned on, the version transmission unit 143 transmits information indicating the driving state (that the air conditioning equipment that has been turned off for a long period of time is turned on) to the equipment management device 120 together with the equipment ID. As a result, the equipment list management unit 121 of the equipment management device 120 deletes the information indicating the operation state (i.e., indicating that the air conditioning equipment has been turned off for a long period of time) of the corresponding air conditioning equipment already recorded in the equipment list. When the information indicating the operation state is deleted from the equipment list, the non-target equipment management unit 122 changes the non-target equipment list.

Similarly, when the communication state of the air conditioning equipment in which the communication error has continued for the predetermined time or more becomes normal, the version transmission unit 143 transmits information indicating the reception state (that the communication state of the air conditioning equipment in which the communication error has continued for the predetermined time becomes normal) to the equipment management device 120 together with the equipment ID. As a result, the equipment list management unit 121 of the equipment management device 120 deletes the information indicating the reception state (that the communication error has continued for the predetermined time) of the corresponding air conditioning equipment already recorded in the equipment list. When the information indicating the reception state is deleted from the equipment list, the non-target equipment management unit 122 changes the non-target equipment list.

The switching process unit 144 is an example of a determination unit and an instruction unit. The switching process unit 144 specifies the target equipment in operation for each refrigerant system based on the target equipment, whose software is to be updated, transmitted from the equipment management device 120 and the non-target equipment list transmitted from the equipment management device 120.

Further, the switching process unit 144 transmits the updated software provided from the equipment management device 120 to the target equipment in operation.

Further, the switching process unit 144 determines whether the communication state detection unit 142 has received a reception completion notification from the target equipment in operation. Further, when it is determined that the communication state detection unit 142 has received the reception completion notification from the target equipment in operation, the switching process unit 144 determines to perform switching to the updated software, and transmits the switching preparation completion notification to the equipment management device 120.

When it is determined that the reception completion notification has not been received from any of target equipment among the target equipment in operation, the switching process unit 144 determines that the target equipment in operation is not switched to the updated software. In this case, the switching process unit 144 does not transmit the switching preparation completion notification to the equipment management device 120.

When the switching instruction is received from the equipment management device 120 in response to the transmission of the switching preparation completion notification, the switching process unit 144 transmits the switching instruction to the target equipment in operation. Accordingly, in the target equipment in operation to which the switching instruction is transmitted, switching to the updated software is performed.

The equipment system 160 is an air conditioning system as described above, and includes two air conditioning systems having different refrigerant systems in the present embodiment. Of these, air conditioning equipment 1 to the air conditioning equipment 1_n (reference numerals 170 to 170_n) are connected to a first refrigerant system, and air conditioning equipment 2 to the air conditioning equipment 2_m (reference numerals 180 to 180_m) are connected to a second refrigerant system.

The air conditioning equipment 1 (reference numeral 170) is, for example, an outdoor unit, and the air conditioning equipment 1_1 to 1_n (reference numerals 170_1 to 170_n) are, for example, indoor units or ventilation devices. The air conditioning equipment 1_1 to 1_n acquire an instruction based on various operations of the user from remote controllers 191_1 to 191_n. The instruction based on various operations of the user includes, for example, user setting information (update prohibition instruction, prohibition release instruction) set by the user for the corresponding air conditioning equipment. Upon acquiring the user setting information, each of the air conditioning equipment 1_1 to 1_n transmits the user setting information to the controller 140.

Similarly, the air conditioning equipment 2 (reference numeral 180) is, for example, an outdoor unit, and the air conditioning equipment 2_1 to 2_m (reference numerals 180_1 to 180_m) are, for example, indoor units or ventilation devices. The air conditioning equipment 2_1 to 2_m acquire an instruction based on various operations of the user from remote controllers 192_1 to 192_m. The instruction based on various operations of the user includes, for example, user setting information (update prohibition instruction, prohibition release instruction) set by the user for the corresponding air conditioning equipment. Upon acquiring the user setting information, each of the air conditioning equipment 2_1 to 2_n transmits the user setting information to the controller 140.

Although the equipment system 160 is described as including two refrigerant systems in the example of FIG. 1, the number of refrigerant systems included in the equipment system 160 is not limited to two. However, in the present embodiment, regardless of the number of refrigerant systems, the collective software updating is performed for each refrigerant system (that is, in the present embodiment, the air conditioning equipment connected to one refrigerant system becomes an update target when the collective software updating is performed).

<Hardware Configuration of Equipment Management Device and Controller>

Next, a hardware configuration of the equipment management device 120 and the controller 140 will be described. FIG. 2 is a diagram illustrating an example of a hardware configuration of the equipment management device and the controller.

(1) Hardware Configuration of Equipment Management Device

As illustrated in 2a of FIG. 2, the equipment management device 120 includes a central processing unit (CPU) 201, a read only memory (ROM) 202, and a random access memory (RAM) 203. The CPU 201, the ROM 202, and the RAM 203 form a so-called computer.

The equipment management device 120 also includes an auxiliary storage device 204, a display device 205, an operation device 206, a communication device 207, and a drive device 208. The hardware components of the equipment management device 120 are connected to each other via a bus 209.

The CPU 201 is a computing device that executes various programs (for example, an equipment management program) installed in the auxiliary storage device 204.

The ROM 202 is a non-volatile memory. The ROM 202 functions as a main storage device that stores various programs and data necessary for the CPU 201 to execute various programs installed in the auxiliary storage device 204. Specifically, the ROM 202 functions as a main storage device that stores a boot program such as a basic input/output system (BIOS) or an extensible firmware interface (EFI).

The RAM 203 is a volatile memory such as a dynamic random access memory (DRAM) or a static random access memory (SRAM). The RAM 203 functions as a main storage device that provides a work area in which various programs installed in the auxiliary storage device 204 are loaded when the programs are executed by the CPU 201.

The auxiliary storage device 204 is an auxiliary storage device that stores various programs and information used when the various programs are executed. The equipment list storage 125, the non-target equipment list storage 126, and the version information storage 127 are implemented in the auxiliary storage device 204.

The display device 205 is a display device that displays an internal state of the equipment management device 120. The operation device 206 is an input device used when an administrator (not illustrated) of the equipment management device 120 inputs various instructions to the equipment management device 120.

The communication device 207 is a communication device that is connected to the network 150 and communicates with the updated software providing device 110, the input device 130, the controller 140, and the like.

The drive device 208 is a device for setting a recording medium 210. The recording medium 210 includes a medium for optically, electrically, or magnetically recording information, such as a CD-ROM, a flexible disk, or a magneto-optical disk. The recording medium 210 may include a semiconductor memory or the like that electrically records information, such as a ROM or a flash memory.

The various programs installed in the auxiliary storage device 204 are installed by, for example, setting the distributed recording medium 210 in the drive device 208 and reading out the various programs recorded in the recording medium 210 by the drive device 208. Alternatively, the various programs installed in the auxiliary storage device 204 may be installed by being downloaded from the network 150 via the communication device 207.

(2) Hardware Configuration of Controller

As illustrated in 2b of FIG. 2, the controller 140 has a hardware configuration (a CPU 221 to a communication device 225) similar to that of the equipment management device 120. Therefore, differences from the equipment management device 120 will be mainly described here.

The difference from the equipment management device 120 is that the controller 140 includes an interface (I/F) device 226. The I/F device 226 is an interface device for transmitting and receiving information to and from a plurality of air conditioning equipment constituting the equipment system 160 under a predetermined communication protocol.

<Details of Equipment List, Non-Target Equipment List, and Version Information>

Next, the equipment list stored in the equipment list storage 125 of the equipment management device 120, the non-target equipment list stored in the non-target equipment list storage 126, and the version information stored in the version information storage 127 will be described in detail.

(1) Details of Equipment List and Non-Target Equipment List

FIG. 3A and FIG. 3B are first and second diagrams illustrating examples of the equipment list and the non-target equipment list. As illustrated in the FIG. 3A, an equipment list 300 includes "refrigerant system", "equipment ID", "equipment name", "model name", and "operation state or reception state" as information items.

In the "refrigerant system", information related to a refrigerant system to which a plurality of air conditioning equipment constituting the equipment system 160 are connected is stored. In the "equipment ID", identifiers for identifying a plurality of air conditioning equipment constituting the equipment system 160 are stored. In the "equipment name", names of a plurality of air conditioning equipment constituting the equipment system 160 are stored. In the "model name", a model name of each air conditioning equipment constituting the equipment system 160 is stored.

In the "operation state or reception state", information indicating the operation state of the corresponding air conditioning equipment and information indicating the reception state of the updated software in the corresponding air conditioning equipment are stored. As described above, the information indicating the operation state recorded in the equipment list 300 includes "user setting information (update prohibition instruction) set by a user" and "information indicating the driving state input by the administrator 131 (information indicating that the power supply is off for a long period of time)."

Further, the information indicating the reception state includes "information indicating that a state of communication error has continued for a predetermined time."

On the other hand, as illustrated in FIG. 3B, a non-target equipment list 310 is a list indicating air conditioning equipment that is not in operation specified based on the information indicating the operation state and the information indicating the reception state among the plurality of air conditioning equipment constituting the equipment system 160. The non-target equipment list 310 includes "refrigerant system", "equipment ID", and "equipment name" as information items.

In the "refrigerant system", information related to the refrigerant system to which the air conditioning equipment that is not in operation is connected is stored. In the "equipment ID", an identifier for identifying the air conditioning equipment that is not in operation is stored. In the "equipment name", the name of the air conditioning equipment that is not in operation is stored.

(2) Details of Version Information

FIG. 4 is a diagram illustrating an example of version information. As illustrated in FIG. 4, version information 400 includes "refrigerant system", "equipment ID", "equipment name", "model name", and "version" as information items.

Of these, the "refrigerant system" to "model name" stores the same information as the "refrigerant system" to "model name" of the equipment list in FIG. 3A, and thus description thereof is omitted here.

The "Version" stores information indicating the version of software currently included in the corresponding air conditioning equipment.

<Flow of Software Updating Process>

Figure 5:
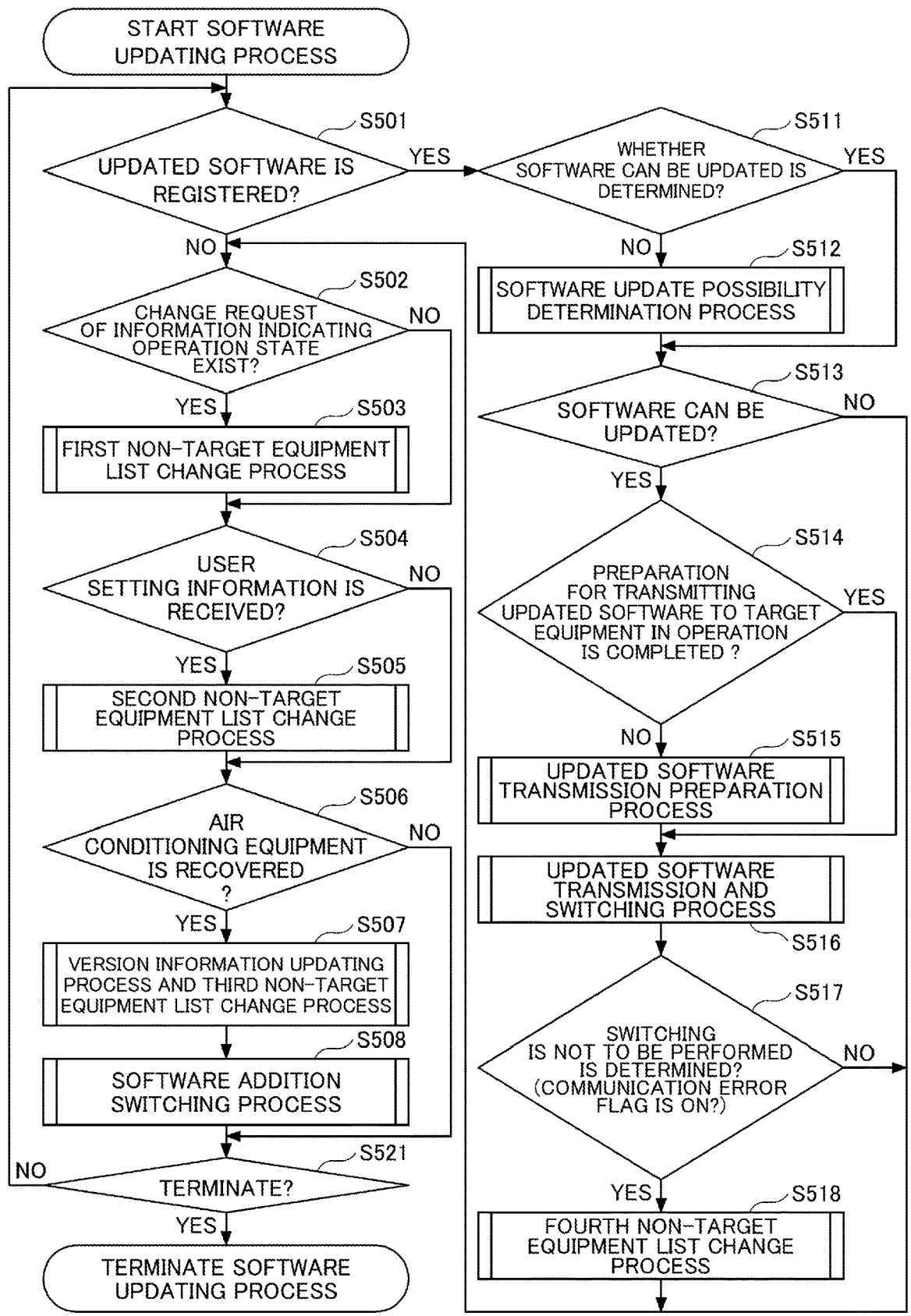
FIG. 5 is a flowchart illustrating a flow of software updating process.

Next, a flow of a software updating process by the software updating system 100 will be described. FIG. 5 is a flowchart illustrating a flow of the software updating process.

In step S501, the switching management unit 124 of the equipment management device 120 determines whether the updated software is registered in the updated software providing device 110. When it is determined in step S501 that the updated software is not registered (i.e., NO in step S501), the process proceeds to step S502.

In step S502, the equipment list management unit 121 of the equipment management device 120 determines whether a request to change the information indicating the driving state of the air conditioning equipment has been received from the administrator 131 via the input device 130.

When it is determined in step S502 that the request to change the information indicating the driving state of the air conditioning equipment has been received (i.e., YES in step S502), the process proceeds to step S503. In step S503, the equipment list management unit 121 and the non-target equipment management unit 122 of the equipment management device 120 execute a first non-target equipment list change process, and the process proceeds to step S504 (details of the first non-target equipment list change process will be described later).

Conversely, when it is determined in step S502 that the request to change the information indicating the driving state of the air conditioning equipment has not been received (i.e., NO in step S502), the process directly proceeds to step S504.

In step S504, the non-target equipment updating unit 141 of the controller 140 determines whether the user setting information has been received from any of the air conditioning equipment via any of the remote controllers 191_1 to 192_m.

When it is determined in step S504 that the user setting information has been received (i.e., YES in step S504), the process proceeds to step S505. In step S505, the non-target equipment updating unit 141 or the like of the controller 140 executes a second non-target equipment list change process, and then proceeds to step S506 (details of the second non-target equipment list change process will be described later).

Conversely, when it is determined in step S504 that the user setting information has not been received (i.e., NO in step S504), the process directly proceeds to step S506.

In step S506, the version transmission unit 143 of the controller 140 determines whether any of the air conditioning equipment is recovered. Determining whether the air conditioning equipment registered in the non-target equipment list 310 is recovered includes: determining whether a power supply of an air conditioning equipment that has been turned off for a long period of time is turned on (whether the power supply of the air conditioning equipment has been restored); and determining whether a communication state of an air conditioning equipment in which a communication error has continued for a predetermined time has become normal (whether the communication state of the air conditioning equipment has recovered).

When the power supply of the air conditioning equipment that has been turned off for a long period of time is turned on or when the communication state of the air conditioning equipment in which a communication error has continued for a predetermined time becomes normal, the air conditioning equipment transmits the version of the software currently included in the air conditioning equipment and the equipment ID to the controller 140.

Therefore, when the version of the software and the equipment ID are transmitted from any one of the air conditioning equipment, the version transmission unit 143 of the controller 140 determines that the air conditioning equipment is recovered.

When it is determined in step S506 that the air conditioning equipment is recovered (i.e., YES in step S506), the process proceeds to step S507. In step S507, the version transmission unit 143 or the like of the controller 140 executes a version information updating process and a third non-target equipment list change process, and then proceeds to step S508 (details of the version information updating process and the third non-target equipment list change process will be described later).

In step S508, the switching process unit 144 or the like of the controller 140 executes a software addition switching process for switching the recovered air conditioning equipment to the updated software, and then proceeds to step S521 (details of the software addition switching process will be described later).

Conversely, when it is determined in step S506 that none of the air conditioning equipment is recovered (i.e., NO in step S506), the process directly proceeds to step S521.

As described above, in the software updating system 100, the processes from step S502 to step S508 are repeatedly executed before the updated software is registered.

Conversely, when it is determined in step S501 that the updated software is registered (i.e., YES in step S501), the process proceeds to step S511.

The timing at which the switching management unit 124 of the equipment management device 120 determines that the updated software has been registered is not limited to the timing at which the updated software is registered in the updated software providing device 110. For example, even at a timing after the updated software is registered in the updated software providing device 110, if an "update flag" is in the ON state, it is determined in step S501 that the updated software is registered.

Note that the update flag is set to the ON state when the updated software is registered in the updated software providing device 110 and software updating is permitted by the administrator 131, and the update flag is set to the OFF state when the software updating is complete.

In step S511, the switching management unit 124 of the equipment management device 120 determines whether or not determination has been made as to whether the software can be updated. When there is not determination of whether the software can be updated (i.e., NO in step S511), the process proceeds to step S512. In step S512, the switching management unit 124 or the like of the equipment management device 120 executes a software update possibility determination process, and then proceeds to step S513 (details of the software update possibility determination process will be described later).

On the other hand, if it has already been determined whether the software can be updated (i.e., YES in step S511), the process directly proceeds to step S513.

In step S513, the switching management unit 124 of the equipment management device 120 switches between processes according to a result of the software update possibility determination process in step S512. Specifically, in the software update possibility determination process in step S512, when it is determined that the update processing by the updated software is possible (i.e., YES in step S513), the process proceeds to step S514. Conversely, when it is determined that the update processing by the updated software is not possible, the process proceeds to step S502.

In step S514, the switching process unit 144 of the controller 140 determines whether "preparation for transmitting the updated software to the target equipment in operation" is completed. The switching process unit 144 of the controller 140, from the equipment management device 120, determines whether "the updated software has been received", "the target equipment has been received", and "the non-target equipment list has been received." Also, the switching process unit 144 of the controller 140 determines whether the target equipment in operation has been identified. As a result, it is determined whether "preparation for transmitting the updated software to the target equipment in operation" is completed.

In step S514, when it is determined that the "preparation for transmitting the updated software to the target equipment in operation" is not completed (i.e., NO in step S514), the process proceeds to step S515. In step S515, the switching process unit 144 or the like of the controller 140 executes an updated software transmission preparation process, and then proceeds to step S516 (details of the updated software transmission preparation process will be described later).

Conversely, in step S514, when it is determined that the "preparation for transmitting the updated software to the target equipment in operation" is completed (in the case of YES in step S514), the process directly proceeds to step S516. However, even when it is determined that the "preparation for transmitting the updated software to the target equipment in operation" is completed, for example, "if the non-target equipment list is subsequently changed and the changed non-target equipment list is transmitted", the switching process unit 144 of the controller 140 determines that the "preparation for transmitting the updated software to the target equipment in operation" is not completed, and the process proceeds to step S515.

In step S516, the switching process unit 144 or the like of the controller 140 transmits the updated software to the target equipment in operation to execute the switching process, and then proceeds to step S517 (details of the updated software transmission and switching process will be described later). When the updated software is transmitted to the target equipment in operation, the switching process unit 144 of the controller 140 determines whether to perform switching. Then, when it is determined that switching process is to be performed, the switching process is executed.

In step S517, the communication state detection unit 142 of the controller 140 switches the process in accordance with the result of the updated software transmission and switching process in step S516. Specifically, in the updated software transmission and switching process in step S516, when it is determined that switching is not to be performed (i.e., YES in step S517), the process proceeds to step S518. Conversely, when it is determined that switching is to be performed (i.e., NO in step S517), the process proceeds to step S502.

In step S518, the communication state detection unit 142 and the like of the controller 140 execute a fourth non-target equipment list change process, and the process proceeds to step S502 (details of the fourth non-target equipment list change process will be described later).

As described above, in the software updating system 100, after the updated software is registered, each process of steps S511 to S518 is executed in addition to each process of steps S502 to S508 until the update flag is turned to the OFF state.

In step S521, the switching management unit 124 of the equipment management device 120 determines whether to terminate the software updating process. When it is determined in step S521 that the software updating process is to be continued (i.e., NO in step S521), the process returns to step S501. Conversely, when it is determined in step S521 that the software updating process is to be terminated (i.e., YES in step S521), the software updating process is terminated.

<Details of Each Step of Software Updating Process>

Next, among the steps of the software updating process illustrated in FIG. 5, details of the "first non-target equipment list change process (step S503)", the "second non-target equipment list change process (step S505)", the "version information updating process and the third non-target equipment list change process (step S507)", the "software addition switching process (step S508)", the "software update possibility determination process (step S512)", "preparation for transmitting the updated software process (step S515)", the "updated software transmission and switching process (step S516)", and the "fourth non-target equipment list change process (step S518)" will be described.

(1) Details of First Non-Target Equipment List Change Process

Figure 6:
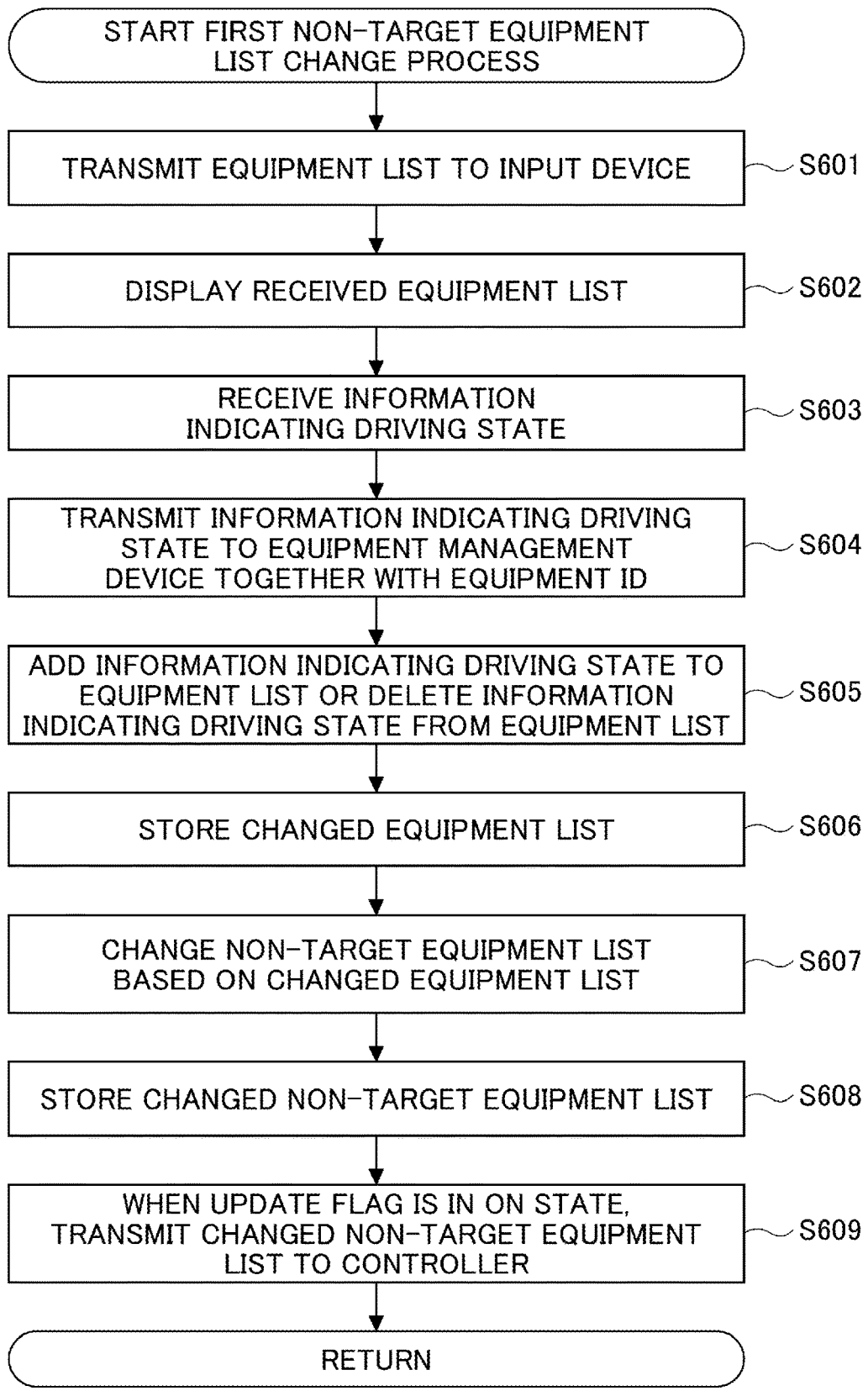
FIG. 6 is a flowchart illustrating a flow of a first non-target equipment list change process.

FIG. 6 is a flowchart illustrating a flow of the first non-target equipment list change process. As described above, the first non-target equipment list change process illustrated in FIG. 6 is started by receiving a change request of the information of the driving state from the administrator 131 via the input device 130.

In step S601, the equipment list management unit 121 of the equipment management device 120 reads out the equipment list 300 from the equipment list storage 125. Further, the equipment list management unit 121 of the equipment management device 120 transmits the read equipment list 300 to the input device 130.

In step S602, the input device 130 displays the received equipment list 300 to the administrator 131.

In step S603, the input device 130 receives an input from the administrator 131 that is performed in response to the display of the equipment list 300. Specifically, the administrator 131 performs an input for adding information indicating the driving state to the displayed equipment list 300, and the input device 130 receives the input. For example, it is assumed that a tenant newly becomes vacant and the indoor unit is turned off for a long period of time. In this case, the administrator 131 inputs the information indicating the driving state (that the power supply is turned off for a long period of time) so as to add the information indicating the driving state (that the power supply is turned off for a long period of time) to the equipment list 300 in association with the equipment ID of the indoor unit. As a result, the input device 130 receives the information indicating the driving state (that the power supply is turned off for a long period of time) in association with the equipment ID.

Alternatively, the administrator 131 performs an input for deleting the information indicating the driving state from the displayed equipment list 300, and the input device 130 receives the input. For example, it is assumed that a tenant is newly filled and the power supply of the indoor unit that has been turned off for a long time is turned on. In this case, the administrator 131 inputs the driving state (information indicating that the air conditioning equipment whose power supply has been off for a long time has been turned on) in order to delete the information indicating the driving state (the power supply has been off for a long time) recorded in association with the equipment ID of the indoor unit. As a result, the input device 130 receives the driving state (information indicating that the air conditioning equipment whose power has been off for a long time has been turned on) in association with the equipment ID.

In step S604, the input device 130 transmits the information indicating the driving state input by the administrator 131 to the equipment management device 120 together with the equipment ID.

In step S605, the equipment list management unit 121 of the equipment management device 120 receives the information indicating the driving state and changes the equipment list 300.

Specifically, when the information indicating the driving state is information indicating that the power supply has been turned off for a long period of time, the equipment list management unit 121 of the equipment management device 120 records the information indicating the driving state in the equipment list 300 as the information indicating the operation state. Conversely, when the information indicating the driving state is information indicating that the power supply of the air conditioning equipment that has been turned off for a long time is turned on, the equipment list management unit 121 of the equipment management device 120 deletes the corresponding information indicating the driving state from the information indicating the operation state of the equipment list 300.

In step S606, the equipment list management unit 121 of the equipment management device 120 stores the changed equipment list 300 in the equipment list storage 125.

In step S607, the non-target equipment management unit 122 of the equipment management device 120 changes the non-target equipment list 310 based on the changed equipment list 300 stored in the equipment list storage 125.

In step S608, the non-target equipment management unit 122 of the equipment management device 120 stores the changed non-target equipment list 310 in the non-target equipment list storage 126.

When the update flag is in the ON state, the switching management unit 124 transmits the changed non-target equipment list 310 to the controller 140 (step S609). Accordingly, the controller 140 can execute the updated software transmission preparation process (step S515 in FIG. 5) based on the latest non-target equipment list 310.

(2) Details of Second Non-Target Equipment List Change Process

Figure 7:
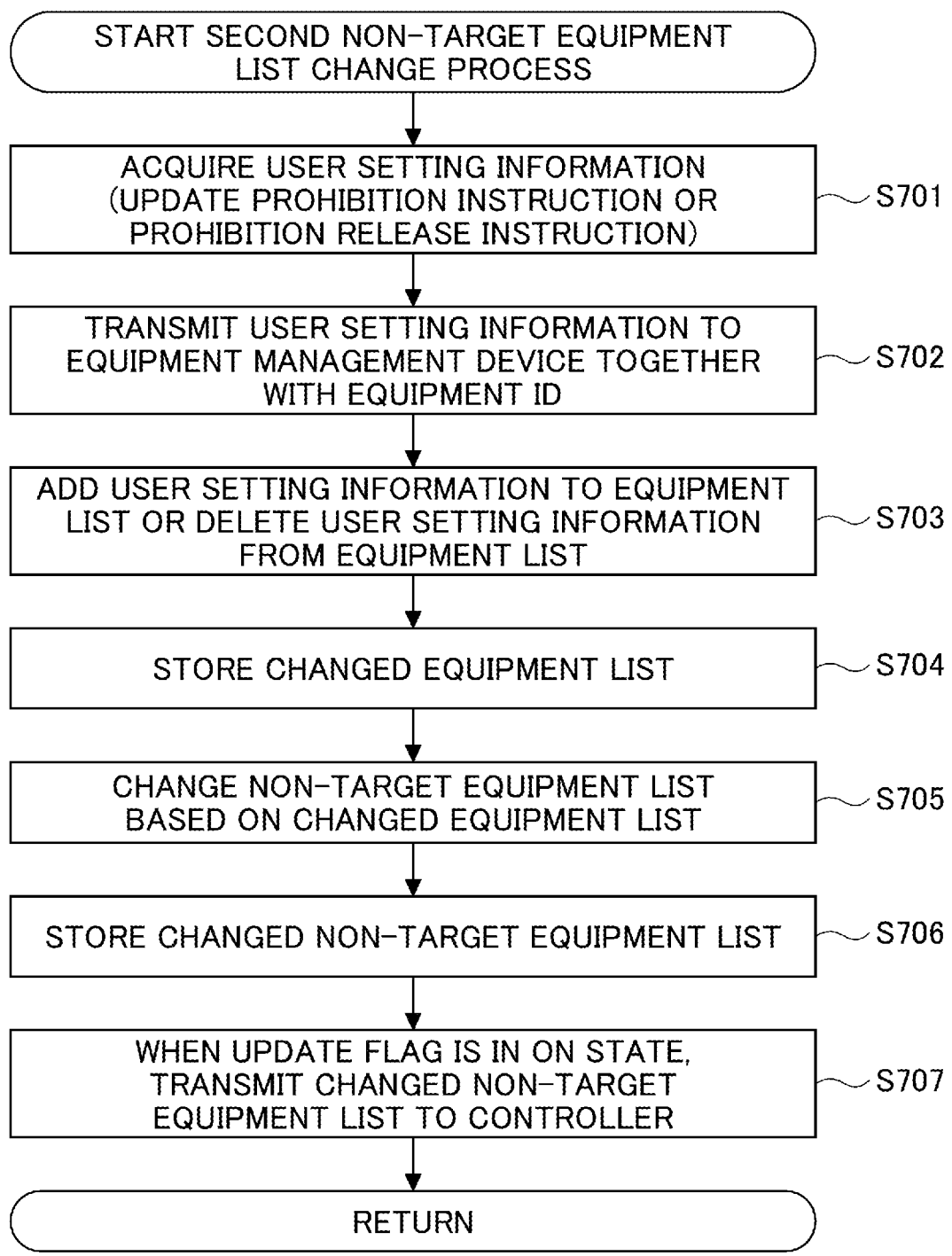
FIG. 7 is a flowchart illustrating a flow of a second non-target equipment list change process.

FIG. 7 is a flowchart illustrating a flow of the second non-target equipment list change process. As described above, when the user setting information is received via any one of the remote controllers 191_1 to 192_m, the second non-target equipment list change process of FIG. 7 is started.

In step S701, the non-target equipment updating unit 141 of the controller 140 acquires the user setting information (update prohibition instruction or update release instruction).

In step S702, the non-target equipment updating unit 141 of the controller 140 identifies the equipment ID of the air conditioning equipment that has transmitted the user setting information. Further, the non-target equipment updating unit 141 of the controller 140 transmits the user setting information to the equipment management device 120 together with the specified equipment ID.

In step S703, the non-target equipment management unit 122 of the equipment management device 120 acquires the user setting information transmitted from the non-target equipment updating unit 141 of the controller 140 and changes the equipment list 300.

Specifically, when the user setting information is the update prohibition instruction, the equipment list management unit 121 of the equipment management device 120 records the user setting information in the equipment list 300 as information indicating the operation state. Conversely, when the user setting information is the prohibition release instruction, the equipment list management unit 121 of the equipment management device 120 deletes the corresponding user setting information from the information indicating the operation state of the equipment list 300.

In step S704, the equipment list management unit 121 stores the changed equipment list 300 in the equipment list storage 125.

In step S705, the non-target equipment management unit 122 of the equipment management device 120 changes the non-target equipment list 310 based on the changed equipment list 300 stored in the equipment list storage 125.

In step S706, the non-target equipment management unit 122 of the equipment management device 120 stores the changed non-target equipment list 310 in the non-target equipment list storage 126.

When the update flag is in the ON state, the switching management unit 124 transmits the changed non-target equipment list 310 to the controller 140 (step S707). Accordingly, the controller 140 can execute the updated software transmission preparation process (step S515 in FIG. 5) based on the latest non-target equipment list 310.

Figure 8:
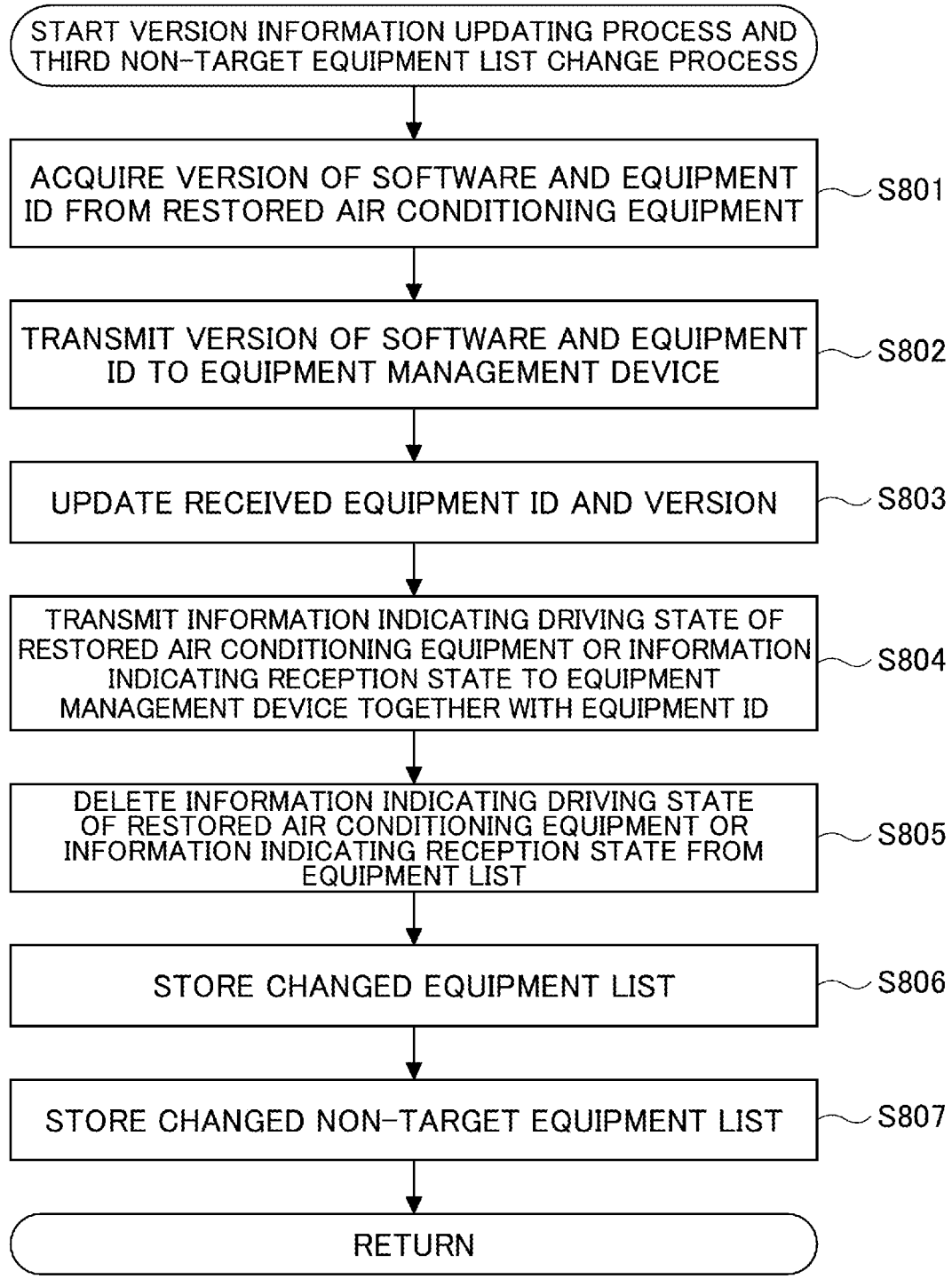
FIG. 8 is a flowchart illustrating a flow of a version information updating process and a third non-target equipment list change process.

(3) Version Information Updating Process and Third Non-Target Equipment List Change Process FIG. 8 is a flowchart illustrating a flow of the version information updating process and the third non-target equipment list change process. As described above, when the version of the software currently included in the air conditioning equipment and the equipment ID are transmitted from the recovered air conditioning equipment, the version information updating process and the third non-target equipment list change process illustrated in FIG. 8 are started.

In step S801, the version transmission unit 143 of the controller 140 acquires the version of the software and the equipment ID transmitted from the restored air conditioning equipment.

In step S802, the version transmission unit 143 of the controller 140 transmits the acquired equipment ID and the version of the software to the equipment management device 120.

In step S803, the software management unit 123 of the equipment management device 120 updates the version of the air conditioning equipment corresponding to the received equipment ID in the version information 400.

In step S804, the version transmission unit 143 of the controller 140 transmits "information indicating the driving state of the restored air conditioning equipment (that the air conditioning equipment whose power has been turned off for a long time is turned on)" or "information indicating the reception state (that the communication state of the air conditioning equipment in which a communication error has continued for a predetermined time has become normal)" to the equipment management device 120 together with the equipment ID.

In step S805, the equipment list management unit 121 of the equipment management device 120 deletes the corresponding information indicating the driving state or the corresponding information indicating the reception state from the information indicating the operation state or the reception state of the equipment list 300.

In step S806, the equipment list management unit 121 of the equipment management device 120 stores the changed equipment list 300 in the equipment list storage 125.

In step S807, the non-target equipment management unit 122 of the equipment management device 120 changes the non-target equipment list 310 based on the changed equipment list 300 stored in the equipment list storage 125, and then returns to step S508.

(4) Software Addition Switching Process

Figure 9:
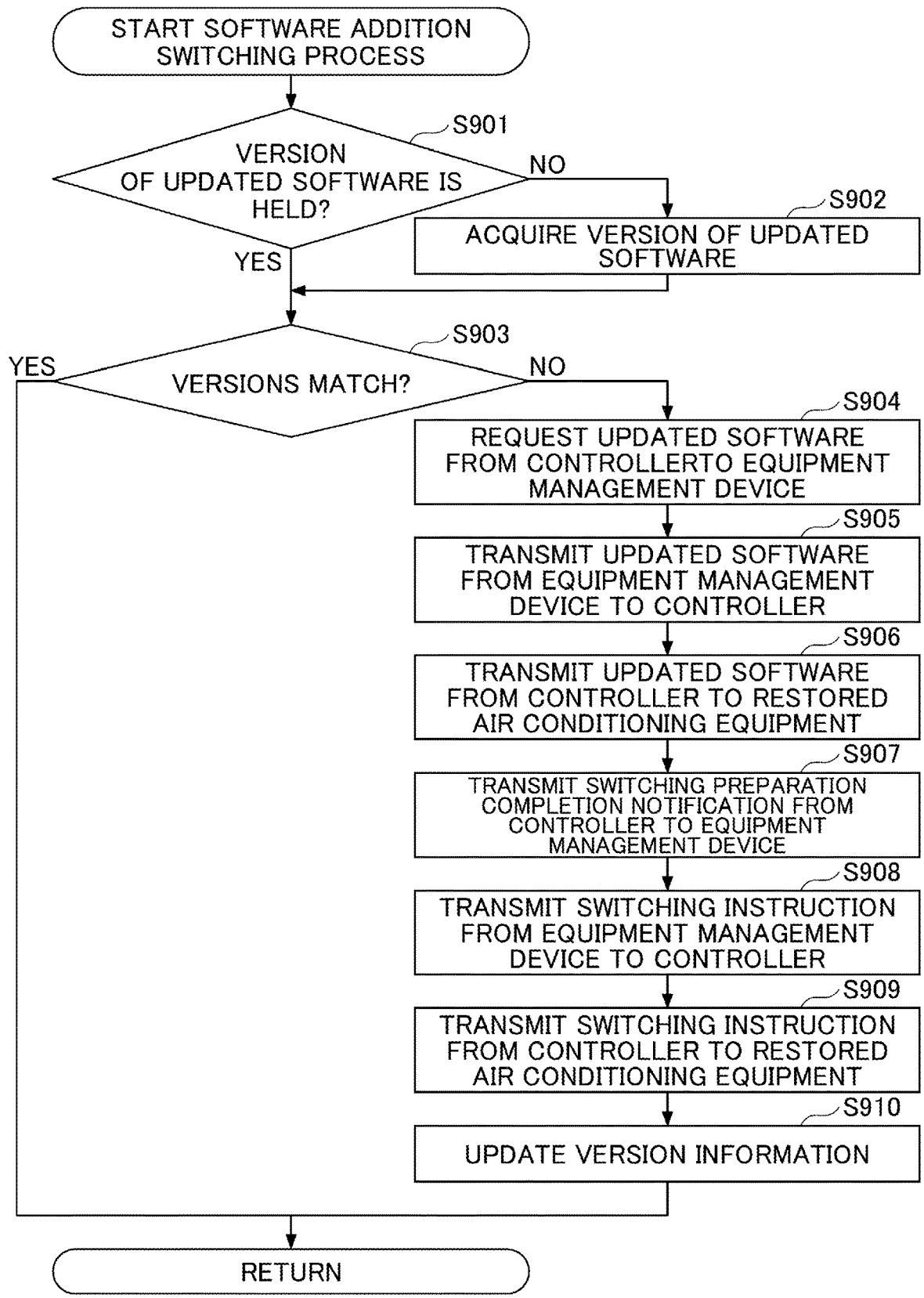
FIG. 9 is a flowchart illustrating a flow of software addition switching process.

FIG. 9 is a flowchart illustrating a flow of the software addition switching process. As described above, after the version information updating process (step S507 in FIG. 5) is executed, the software addition switching process illustrated in FIG. 9 is started.

In step S901, the switching process unit 144 of the controller 140 determines whether the version of the updated software is held. When it is determined in step S901 that the version of the updated software is not held (i.e., NO in step S901), the process proceeds to step S902.

In step S902, the switching process unit 144 of the controller 140 requests the version of the updated software from the equipment management device 120, acquires the version of the updated software, and then proceeds to step S903.

Conversely, with respect to step S903, when it is determined that the version of the updated software is held (i.e., YES in step S901), the process directly proceeds to step S903.

In step S903, the switching process unit 144 of the controller 140 compares the version acquired by the version transmission unit 143 with the version of the updated software acquired from the equipment management device 120, and determines whether they match (whether a predetermined condition is satisfied).

As a result of the comparison, when it is determined in step S903 that the version acquired by the version transmission unit 143 does not match the version of the updated software (i.e., NO in step S903), the process proceeds to step S904.

In step S904, the switching process unit 144 of the controller 140 requests the updated software to the equipment management device 120.

In step S905, the switching management unit 124 of the equipment management device 120 transmits the updated software to the controller 140.

In step S906, the switching process unit 144 of the controller 140 transmits the updated software to the restored air conditioning equipment.

In step S907, the air conditioning equipment that has received the updated software transmits the reception completion notification indicating that the updated software has been successfully received to the controller 140. Further, the switching process unit 144 of the controller 140 transmits the switching preparation completion notification to the equipment management device 120.

In step S908, the switching management unit 124 of the equipment management device 120 transmits the switching instruction to the controller 140.

In step S909, the switching process unit 144 of the controller 140 transmits the switching instruction to the restored air conditioning equipment. As a result, the software of the recovered air conditioning equipment is switched to the updated software.

In step S910, the software management unit 123 of the equipment management device 120 updates the version corresponding to the equipment ID of the restored air conditioning equipment in the version information 400 to the version of the updated software, and then returns to step S521.

(5) Details of Software Update Possibility Determination Process

Figure 10:
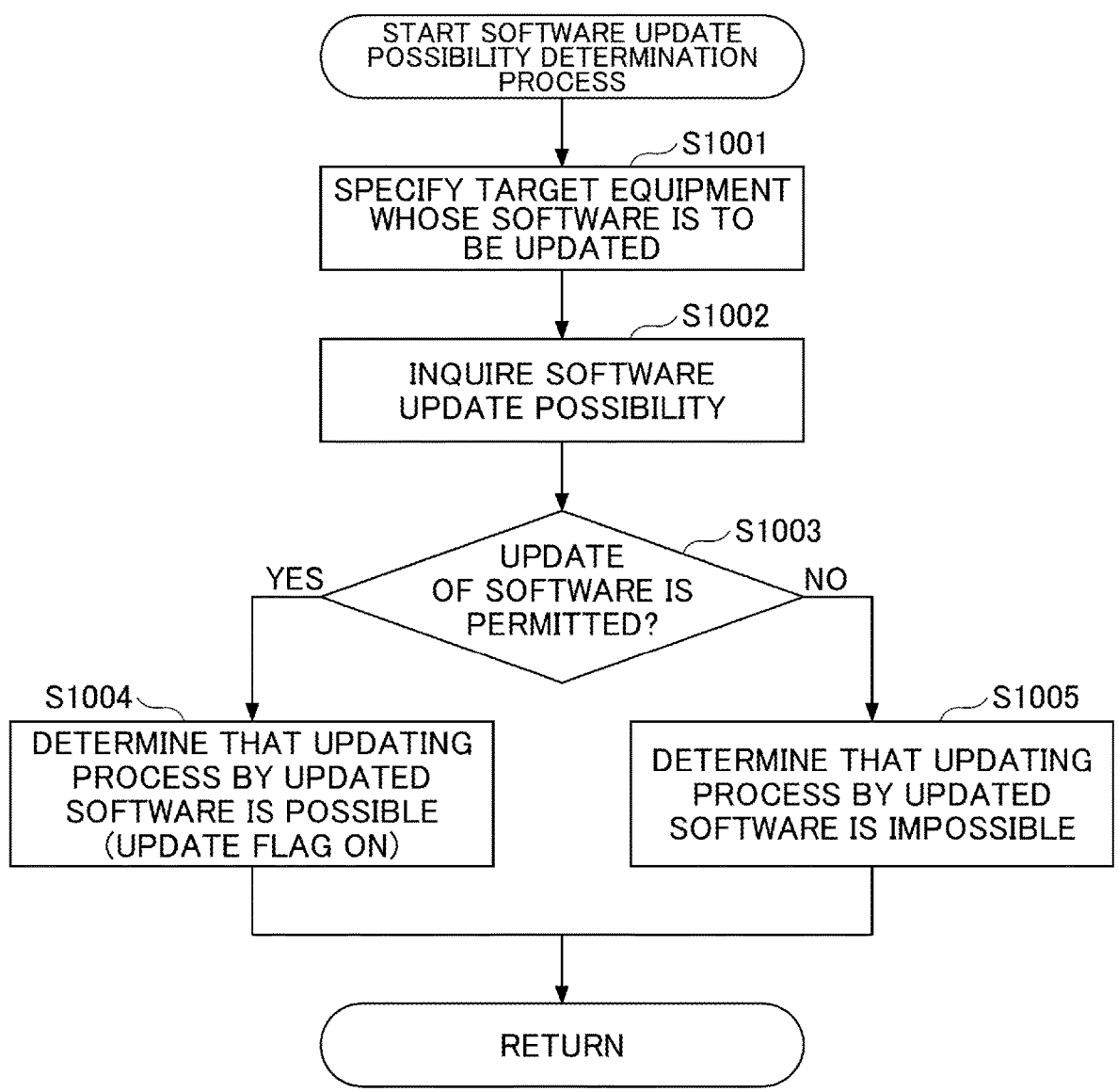
FIG. 10 is a flowchart illustrating a flow of a software updatability determination process.

FIG. 10 is a flowchart illustrating a flow of the software update possibility determination process. As described above, when the updated software is registered and it is not determined by the switching management unit 124 of the equipment management device 120 whether the software update is possible, the software update possibility determination process illustrated in FIG. 10 is started.

In step S1001, the switching management unit 124 of the equipment management device 120 specifies a target equipment whose software is to be updated based on the model name of each air conditioning equipment registered in the equipment list 300.

In step S1002, the switching management unit 124 of the equipment management device 120 transmits the specified target equipment to the input device 130, thereby inquiring of the administrator 131 whether the software update is permitted for the specified target equipment.

In step S1003, the switching management unit 124 of the equipment management device 120 acquires a response to the inquiry.

In step S1003, when the update of the software is permitted by the administrator 131 (i.e., YES in step S1003), the process proceeds to step S1004.

In step S1004, the switching management unit 124 of the equipment management device 120 determines that the updating process by the updated software is possible, sets the update flag to the ON state, and then returns to step S513.

Conversely, in step S1003, when the software update is not permitted by the administrator 131 (i.e., NO in step S1003), the process proceeds to step S1005.

In step S1005, after the switching management unit 124 of the equipment management device 120 determines that the update processing by the updated software is not possible, the process returns to step S513.

(6) Details of Updated Software Transmission Preparation Process

Figure 11:
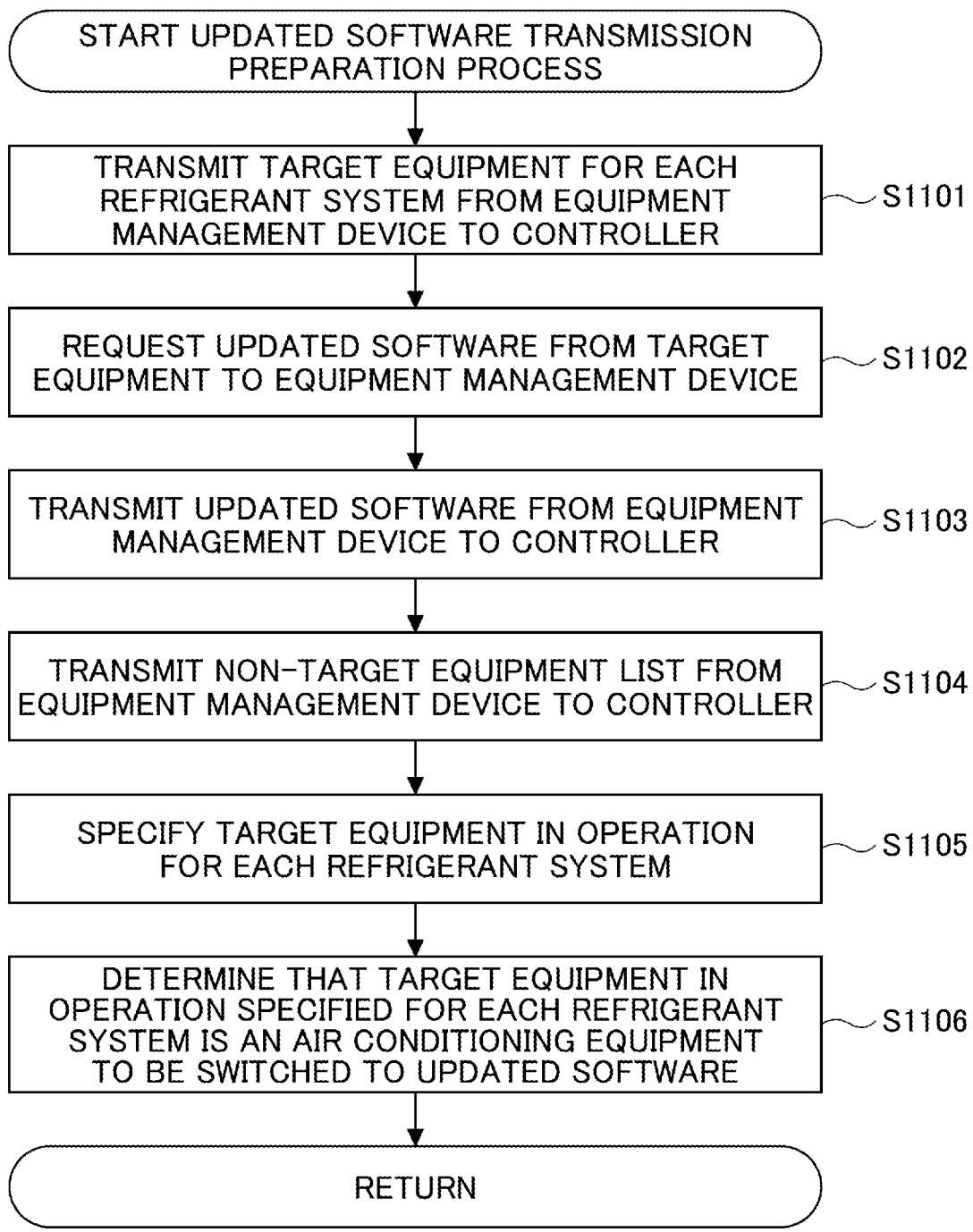
FIG. 11 is a flowchart illustrating a flow of an updated software transmission preparation process.

FIG. 11 is a flowchart illustrating a flow of the updated software transmission preparation process. As described above, when it is determined that the updating process by the updated software is possible and it is determined that "the preparation for transmitting the updated software to the target equipment in operation" is not completed, the updated software transmission preparation illustrated in FIG. 11 is started.

In step S1101, the switching management unit 124 of the equipment management device 120 specifies, for each refrigerant system, an equipment whose software is to be updated, based on the model name of each air conditioning equipment registered in the equipment list 300. Further, the switching management unit 124 of the equipment management device 120 transmits the specified target equipment for each refrigerant system to the controller 140.

In step S1102, the switching process unit 144 of the controller 140 requests the updated software to the equipment management device 120.

In step S1103, the switching management unit 124 of the equipment management device 120 transmits the requested updated software to the controller 140.

In step S1104, the switching management unit 124 of the equipment management device 120 transmits the non-target equipment list 310 stored in the non-target equipment list storage 126 to the controller 140.

In step S1105, the switching process unit 144 of the controller 140 specifies, for each refrigerant system, the target equipment in operation, excluding the air conditioning equipment registered in the non-target equipment list, from the target equipment whose software is to be updated.

In step S1106, the switching process unit 144 of the controller 140 determines that the target equipment in operation specified for each refrigerant system is an air conditioning equipment to be switched to the updated software.

In a case where the updated software and the target equipment have already been received and the updated software transmission preparation process illustrated in FIG. 11 is started by transmission of the changed non-target equipment list, each process of steps S1101 to S1104 may be omitted.

In this case, in step S1105, the switching process unit 144 of the controller 140 newly specifies, for each refrigerant system, the target equipment in operation, excluding the air conditioning equipment registered in the changed non-target equipment list, from the target equipment whose software is to be updated.

Further, in step S1106, the switching process unit 144 of the controller 140 determines that the target equipment in operation newly specified for each refrigerant system is the air conditioning equipment to be switched to the updated software.

(7) Details of Updated Software Transmission and Switching Process

Figure 12:
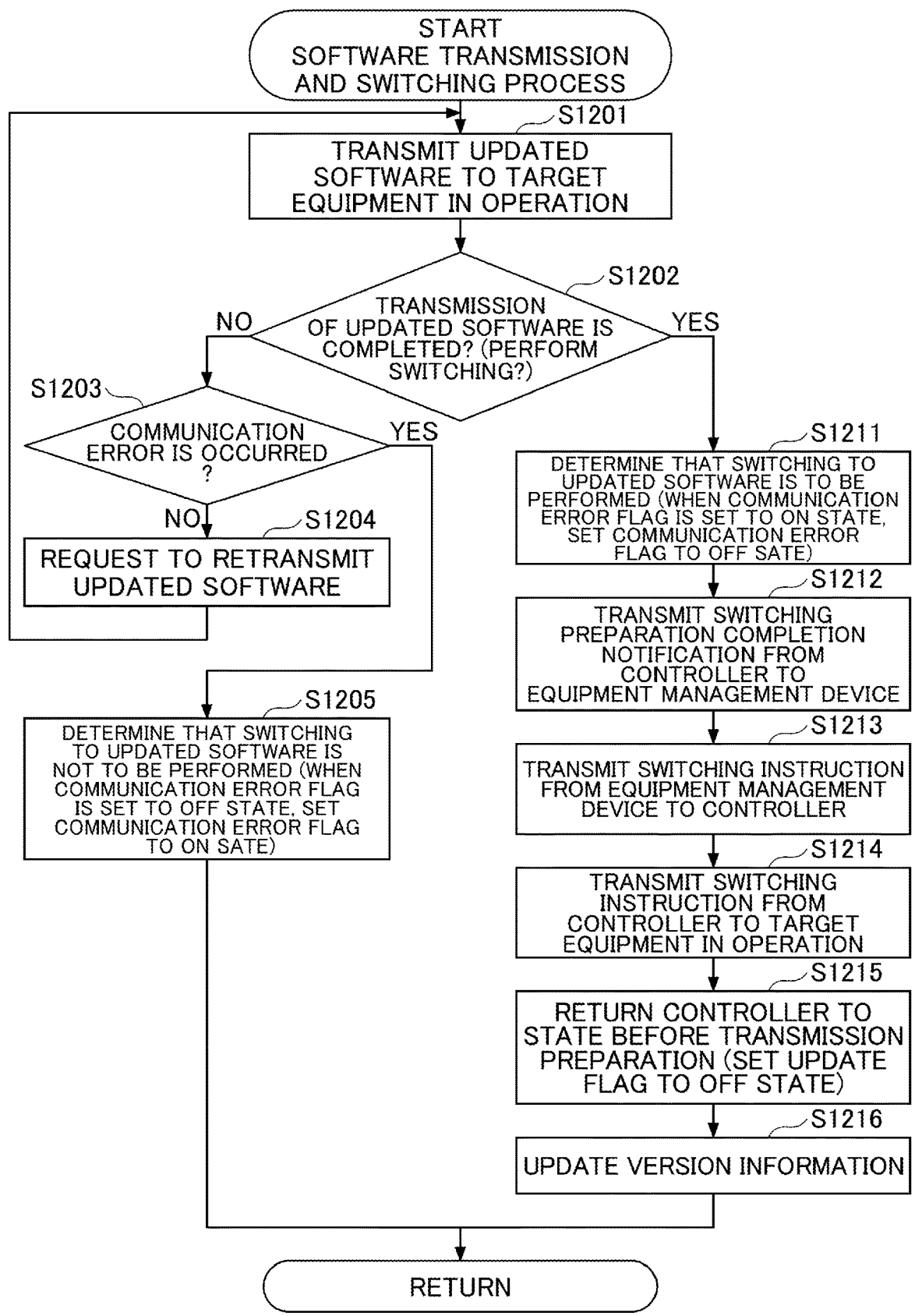
FIG. 12 is a flowchart illustrating a flow of an updated software transmission and switching process.

FIG. 12 is a flowchart illustrating a flow of the updated software transmission and switching process. As described above, after the update software transmission preparation processing (step S515 in FIG. 5) is executed, the update software transmission and switching processing illustrated in FIG. 12 is started.

In step S1201, the switching process unit 144 of the controller 140 transmits the updated software to the target equipment in operation.

In step S1202, the switching process unit 144 of the controller 140 determines whether the communication state detection unit 142 has received the reception completion notification indicating successful reception of the updated software from the target equipment in operation to which the updated software has been transmitted. By determining whether the communication state detection unit 142 has received, the switching process unit 144 determines whether to perform switching to the updated software.

When it is determined in step S1202 that the reception completion notification indicating that the updated software has been successfully received has not been received (i.e., NO in step S1202), the process proceeds to step S1203. If there is at least one target equipment, among the target equipment in operation to which the updated software has been transmitted, from which the reception completion notification is not received, the communication state detection unit 142 determines that the reception completion notification has not been received and proceeds to step S1203.

In step S1203, the communication state detection unit 142 of the controller 140 determines whether a communication error has occurred. When it is determined in step S1203 that a communication error has not occurred (i.e., NO in step S1203), the process proceeds to step S1204.

In step S1204, the communication state detection unit 142 of the controller 140 requests the switching process unit 144 to retransmit the updated software for the air conditioning equipment that has not succeeded in receiving the updated software, and then returns to step S1201. Thereafter, the switching process unit 144 of the controller 140 transmits the updated software to the target equipment, among the target equipment in operation, from which the reception completion notification is not received.

Conversely, when it is determined in step S1203 that a communication error has occurred (i.e., YES in step S1203), the process proceeds to step S1205. Note that the communication state detection unit 142 of the controller 140 determines that the communication error has occurred (reception has failed) when, for example, a reception completion notification indicating successful reception of the updated software is not transmitted from the air conditioning equipment to which the updated software has been retransmitted.

In step S1205, when the communication error flag is set to the OFF state, the communication state detection unit 142 of the controller 140 sets the communication error flag to the ON state. As a result, the switching process unit 144 of the controller 140 determines that switching to the updated software is not to be performed for the target equipment in operation, and returns to step S517 in FIG. 5.

Conversely, in step S1202, when it is determined that the reception completion notification indicating successful reception of the updated software has been received from all the air conditioning equipment to which the updated software has been transmitted (i.e., YES in step S1202), the process proceeds to step S1211.

A case where it is determined that the reception completion notification has been received from all the air conditioning equipment to which the updated software has been transmitted includes "a case where it is determined that reception completion notification has been received from all the air conditioning equipment to which the updated software has been transmitted without it being determined that a communication error has occurred (reception has failed)" and "a case in which, although occurrence of a communication error (reception has failed) had been determined, before a certain period of time (for example, three days) has passed, it is determined that a reception completion notification has been received from all the air conditioning equipment to which the updated software has been transmitted, as a result of the communication error being resolved."

In step S1211, when the communication error flag is set to the ON state, the communication state detection unit 142 of the controller 140 sets the communication error flag to the OFF state. As a result, the switching process unit 144 of the controller 140 determines to switch to the updated software.

In step S1212, the switching process unit 144 of the controller 140 transmits the switching preparation completion notification to the equipment management device 120.

In step S1213, when the switching preparation completion notification is received, the switching management unit 124 of the equipment management device 120 transmits the switching instruction to the controller 140.

In step S1214, the switching process unit 144 of the controller 140 transmits the switching instruction to the target equipment in operation of the corresponding refrigerant system.

In step S1215, the switching management unit 124 of the equipment management device 120 sets the update flag to the OFF state. Thereby, the switching process unit 144 of the controller 140 returns to the state before the transmission preparation of the updated software.

In step S1216, the software management unit 123 of the equipment management device 120 updates the version of the software of the target equipment in operation of the corresponding refrigerant system to the version of the updated software in the version information 400.

(8) Details of Fourth Non-Target Equipment List Change Process

Figure 13:
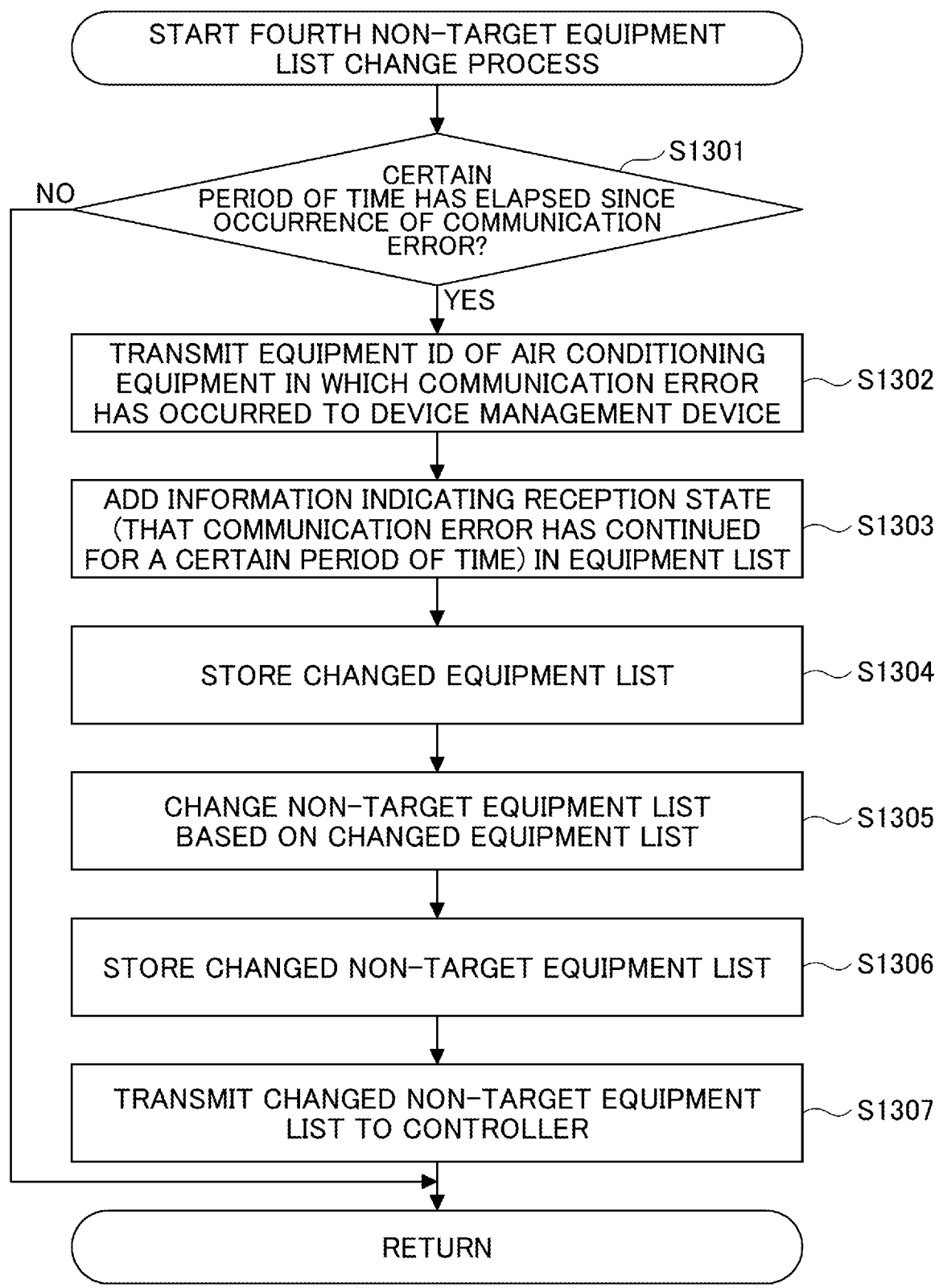
FIG. 13 is a flowchart illustrating a flow of a fourth non-target equipment list change process.

FIG. 13 is a flowchart illustrating a flow of the fourth non-target equipment list change process. As described above, in the updated software transmission and switching process, when it is determined that the switching is not to be performed due to the occurrence of the communication error, the fourth non-target equipment list change process illustrated in FIG. 13 is started.

In step S1301, the communication state detection unit 142 of the controller 140 determines whether a certain period of time has elapsed since the occurrence of the communication error. When it is determined in step S1301 that the predetermined time has not elapsed (i.e., NO in step S1301), the process proceeds to step S502 in FIG. 5.

Conversely, when it is determined in step S1301 that the predetermined time has elapsed (i.e., YES in step S1301), the process proceeds to step S1302.

In step S1302, the communication state detection unit 142 of the controller 140 transmits the equipment ID of the air conditioning equipment in which the communication error has occurred to the device management device together with information indicating that the communication error has continued for a certain period of time.

In step S1303, the equipment list management unit 121 of the equipment management device 120 records information indicating that the communication error has continued for a certain period of time in the equipment list 300 as information indicating the reception state of the updated software.

In step S1304, the equipment list management unit 121 of the equipment management device 120 stores the changed equipment list 300 in the equipment list storage 125.

In step S1305, the non-target equipment management unit 122 of the equipment management device 120 changes the non-target equipment list 310 based on the changed equipment list 300 stored in the equipment list storage 125.

In step S1306, the non-target equipment management unit 122 of the equipment management device 120 stores the changed non-target equipment list 310 in the non-target equipment list storage 126.

In step S1307, the switching management unit 124 of the equipment management device 120 transmits the changed non-target equipment list 310 to the controller 140. Accordingly, the controller 140 can execute the updated software transmission preparation process (step S515 in FIG. 5) based on the latest non-target equipment list 310.

<Specific Example of State Transition of Air Conditioning Equipment in Software Updating Process>

Next, a specific example of the state transition of each air conditioning equipment when the software updating process is executed in the software updating system 100 will be described using FIG. 14 to FIG. 17 with reference to the flowcharts of FIG. 5 to FIG. 13. FIG. 14 to FIG. 17 are first to third diagrams illustrating the state transition of each air conditioning equipment in the software updating process.

Figure 14:
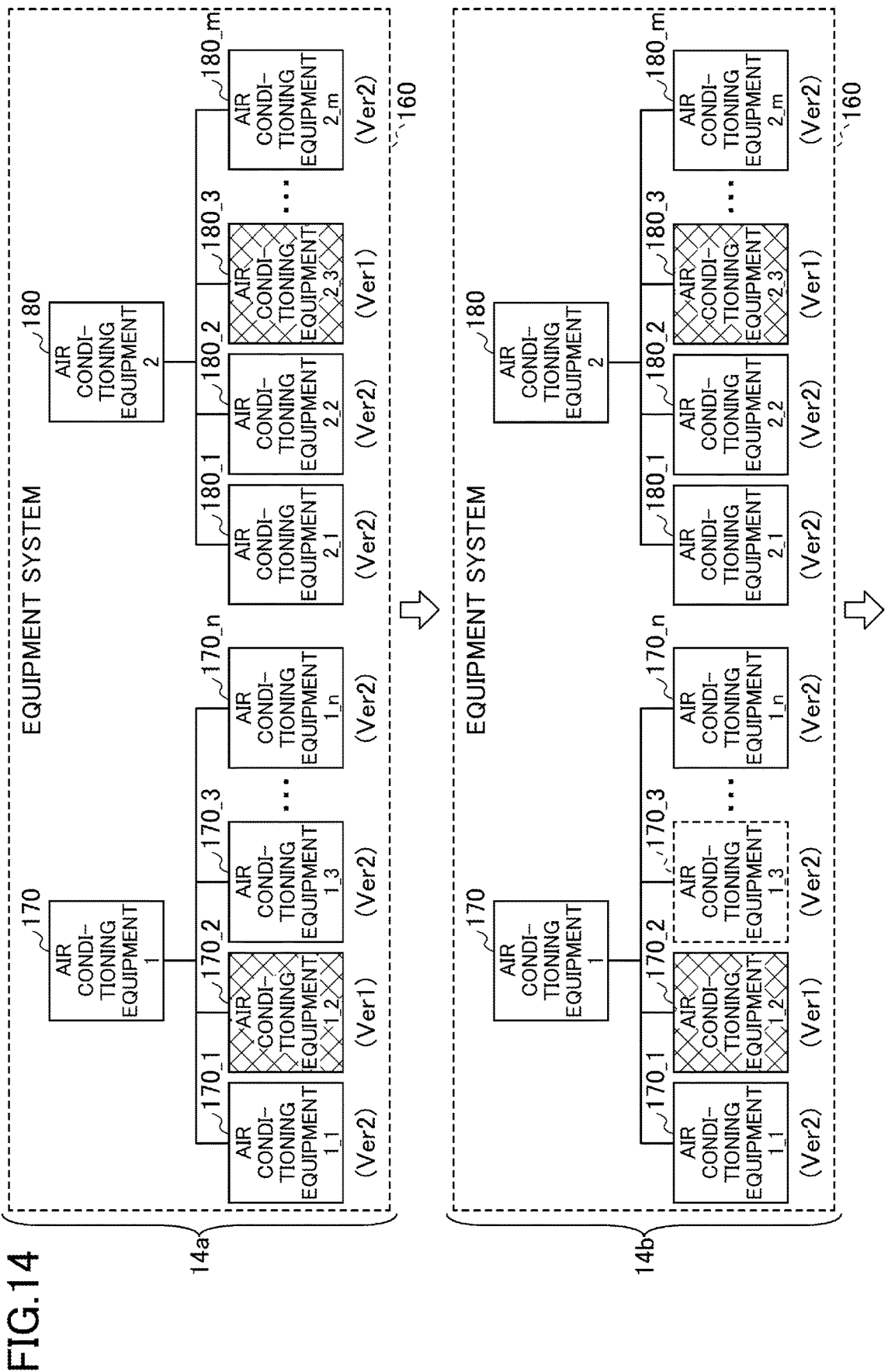
FIG. 14 is a first diagram illustrating a state transition of each air conditioning equipment in a software updating process.

14a of FIG. 14 illustrates a first state of each of the plurality of air conditioning equipment constituting the equipment system 160.

Specifically, an example of 14a of FIG. 14 illustrates that the user setting information of the air conditioning equipment 1_2 (reference numeral 170_2) among the air conditioning equipment connected to the first refrigerant system is recorded in the equipment list 300 as the air conditioning equipment in which the update is prohibited. Further, it is indicated that the corresponding equipment ID is registered in the non-target equipment list 310 (refer to the shaded portion). The example of 14a of FIG. 14 illustrates that the version of software currently included in the air conditioning equipment 1_2 (reference numeral 170_2) among the air conditioning equipment connected to the first refrigerant system is "Ver1." Further, it is indicated that the version of software currently included in the other air conditioning equipment is "Ver2." The example of 14*a* of FIG. 14 illustrates that the information indicating the operation state of the air conditioning equipment 2_3 (reference numeral 180_3) among the air conditioning equipment connected to the second refrigerant system is recorded in the equipment list 300 as the air conditioning equipment that has been powered off for a long period of time. Further, it is indicated that the corresponding equipment ID is registered in the non-target equipment list 310 (refer to the shaded portion). The example of 14*a* of FIG. 14 illustrates that the version of software currently included in the air conditioning equipment 2_3 (reference numeral 180_3) among the air conditioning equipment connected to the second refrigerant system is "Ver1." Further, it is indicated that the version of software currently included in the other air conditioning equipment is "Ver2."

Here, it is assumed that updated software of version="Ver3" is registered in the first state illustrated in 14*a* of FIG. 14. Specifically, it is assumed that the processing is executed in the order of YES in step S501 to NO in step S511 of FIG. 5.

Further, it is assumed that the administrator 131 permits software updating for an air conditioning equipment (target equipment in operation) of a predetermined model other than the air conditioning equipment 1_2 (reference numeral 170_2) and the air conditioning equipment 2_3 (reference numeral 180_3).

Specifically, it is assumed that the processing is executed in the order of step S512 of FIG. 5, YES in step S1003 of FIG. 10, YES in step S513 of FIG. 5, to NO in step S514.

Further, it is assumed that the updated software is transmitted to the air conditioning equipment (target equipment in operation) of the predetermined model other than the air conditioning equipment 1_2 (reference numeral 170_2) and the air conditioning equipment 2_3 (reference numeral 180_3). Specifically, it is assumed that the processing is executed in the order of step S515 to step S516 of FIG. 5.

At this time, it is assumed that the reception completion notification is not transmitted from the air conditioning equipment 1_3 (reference numeral 170_3) among the air conditioning equipment connected to the first refrigerant system and to which the updated software has been transmitted, and it is determined that the switching is not to be performed due to the occurrence of the communication error. Specifically, it is assumed that the processing is executed in the order of NO in step S1202, YES in step S1203, to step S1205 of FIG. 12.

On the other hand, for the air conditioning equipment connected to the second refrigerant system, it is assumed that reception completion notifications are transmitted from all the air conditioning equipment to which the updated software has been transmitted, and it is determined that switching is to be performed. Specifically, it is assumed that the processing is executed in the order of YES in step S1202, steps S1211, to S1212 of FIG. 12.

Accordingly, the equipment system 160 transitions to the second state illustrated in the 14*b* of FIG. 14. An example of 14*b* of FIG. 14 illustrates that, among the air conditioning equipment connected to the first refrigerant system, the air conditioning equipment other than the air conditioning equipment 1_2 (reference numeral 170_2) and the air conditioning equipment 1_3 (reference numeral 170_3) holds the updated software. Note that in the first refrigerant system, the air conditioning equipment other than the air conditioning equipment 1_2 (reference numeral 170_2) and the air conditioning equipment 1_3 (reference numeral 170_3) is, in other words, the target equipment other than the target equipment that is not in operation and the target equipment that is in operation and from which reception is incomplete (refer to other than shaded portion and dotted lines). The example of 14*b* of FIG. 14 illustrates that the air conditioning equipment other than the air conditioning equipment 2_3 (reference numeral 180_3) among the air conditioning equipment connected to the second refrigerant system holds the updated software. Note that in the second refrigerant system, the air conditioning equipment other than the air conditioning equipment 2_3 (reference numeral 180_3) is, in other words, the target equipment in operation (refer to other than shaded portion).

Figure 15:
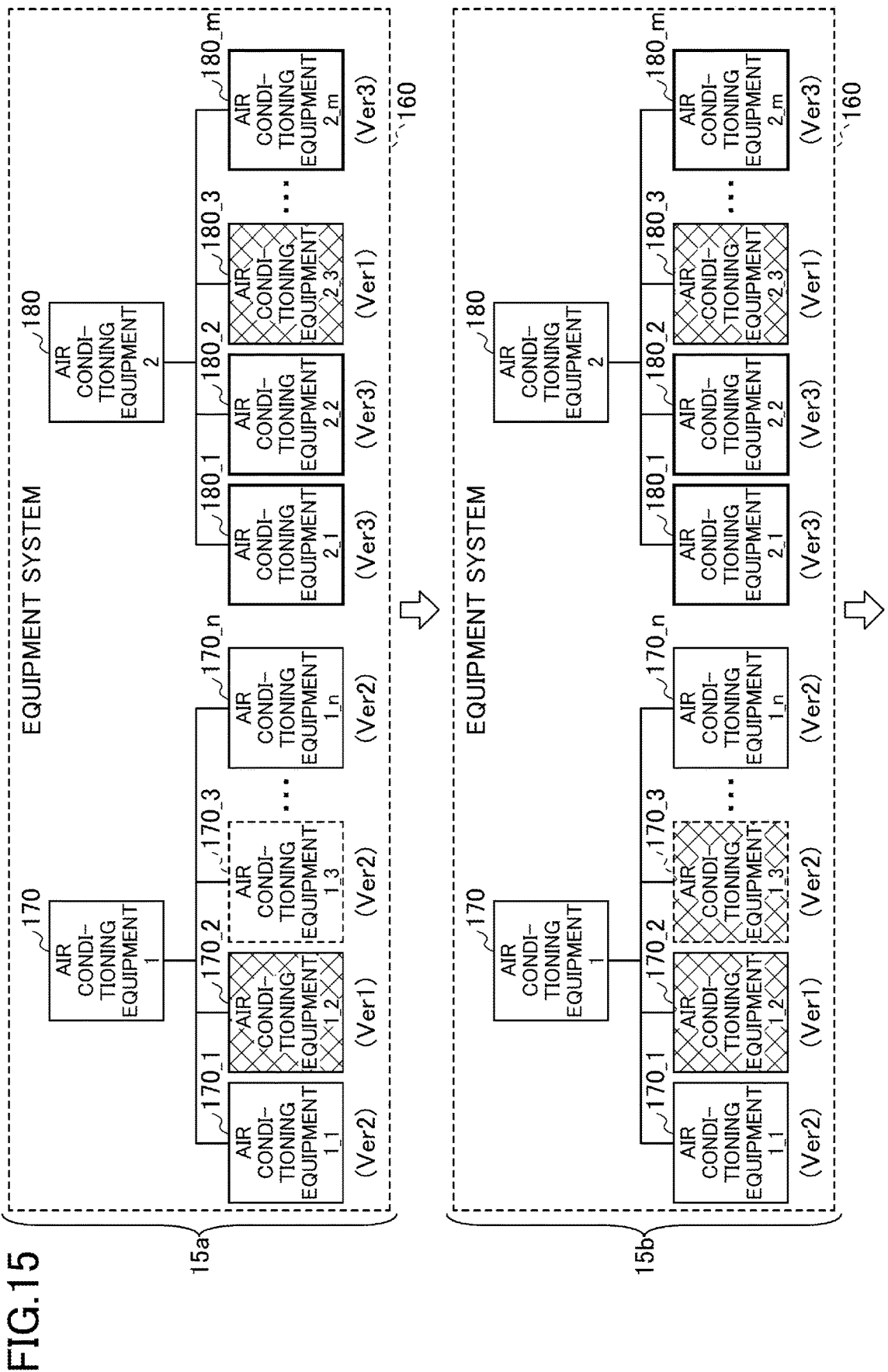
FIG. 15 is a second diagram illustrating a state transition of each air conditioning equipment in a software updating process.

Further, an example of 15*a* of FIG. 15 illustrates a third state of each of the plurality of air conditioning equipment constituting the equipment system 160. As illustrated in 15*a* of FIG. 15, in the first refrigerant system, since a communication error has occurred in the air conditioning equipment 1_3 (reference numeral 170_3), switching to the updated software is not to be performed, and the version of the software included in each air conditioning equipment is the same as that of 14*a* of FIG. 14.

On the other hand, as illustrated in 15*a* of FIG. 15, in the second refrigerant system, the air conditioning equipment (target equipment in operation) other than the air conditioning equipment 2_3 (reference numeral 180_3) registered in the non-target equipment list 310 is switched to the updated software based on the switching instruction. The example of 15*a* of FIG. 15 indicates that the air conditioning equipment other than the air conditioning equipment 2_3 (reference numeral 180_3) has been switched to the updated software and the version has been updated to "Ver3" (refer to the thick line). Specifically, it is illustrated that the processing is executed in the order of steps S1213 to S1216 of FIG. 12, to step S502 of FIG. 5.

Here, it is assumed that the communication error of the air conditioning equipment 1_3 (reference numeral 170_3) has continued in the first refrigerant system. Specifically, it is assumed that the processing is executed in the order of NO in step S502, NO in step S504, NO in step S506, NO in step S521, YES in step S511, to YES in step S513 of FIG. 5.

Further, it is assumed that the processing is executed in the order of YES in step S514, step S516, YES in step S517 of FIG. 5, NO in step S1301 of FIG. 13, to step S502 of FIG. 5.

Thereafter, it is assumed that the time during which the communication error of the air conditioning equipment 1_3 (reference numeral 170_3) continues reaches a certain time. Specifically, it is assumed that the processing is executed in the order of YES in step S1301, steps S1302 to S1307 of FIG. 13, steps S502 to S521, YES in step S501, to steps S511 to S516.

Accordingly, the equipment system 160 transitions to the fourth state illustrated in 15*b* of FIG. 15. As illustrated in 15*b* of FIG. 15, in the first refrigerant system, the air conditioning equipment 1_3 (reference numeral 170_3) is newly added to the non-target equipment list 310 (refer to the shaded portion).

When the air conditioning equipment 1_3 (reference numeral 170_3) is added to the non-target equipment list 310, the air conditioning equipment 1_3 (reference numeral 170_3) is excluded from the transmission destinations to which the controller 140 transmits the updated software (because the air conditioning equipment 1_3 becomes the target equipment that is not in operation). As a result, in the first refrigerant system, the controller 140 determines that reception completion notifications have been received from all the air conditioning equipment to which the updated software has been transmitted, and transmits the switching instruction to all the air conditioning equipment (target equipment in operation) of the transmission destinations.

Specifically, the processing is executed in the order of YES in step S1202 of FIG. 12 to step S1211 to step S1216 of FIG. 12.

Figure 16:
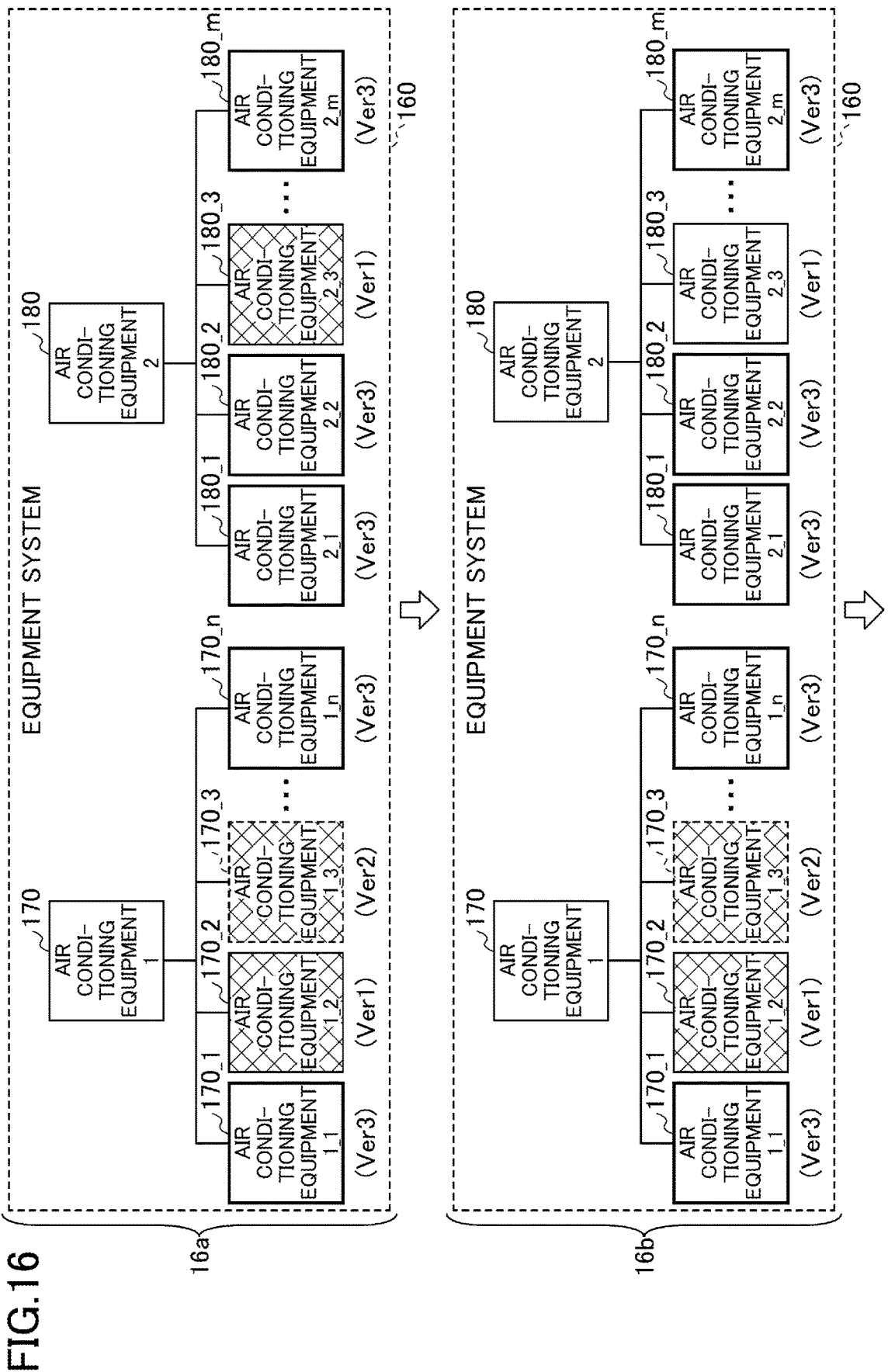
FIG. 16 is a third diagram illustrating a state transition of each air conditioning equipment in a software updating process.

An example of 16a of FIG. 16 illustrates a fifth state of each of the plurality of air conditioning the equipment system 160. The example of 16a in FIG. 16 indicates that, in the first refrigerant system, the air conditioning equipment (target equipment in operation) other than the air conditioning equipment 1_2 (reference numeral 170_2) and the air conditioning equipment 1_3 (reference numeral 170_3) registered in the non-target equipment list 310 has been switched to the updated software. The example of 16a in FIG. 16 indicates that the versions of the air conditioning equipment other than the air conditioning equipment 1_2 (reference numeral 170_2) and the air conditioning equipment 1_3 (reference numeral 170_3) registered in the non-target equipment list 310 have been updated to "Ver3" (refer to the thick line).

Here, in the second refrigerant system, it is assumed that the air conditioning equipment 2_3 (reference numeral 180_3) whose power supply has been turned off for a long period of time is turned on. Specifically, it is assumed that the processing is executed in the order of YES in step S506, step S507, to step S508 of FIG. 5.

An example of 16b of FIG. 16 illustrates a sixth state of each of the plurality of air conditioning equipment constituting the equipment system 160. The example of 16b of FIG. 16 indicates that, in the second refrigerant system, the power supply of the air conditioning equipment 2_3 (reference numeral 180_3) is turned on and it is determined that the version of the updated software does not match (refer to the non-shaded portions).

Figure 17:
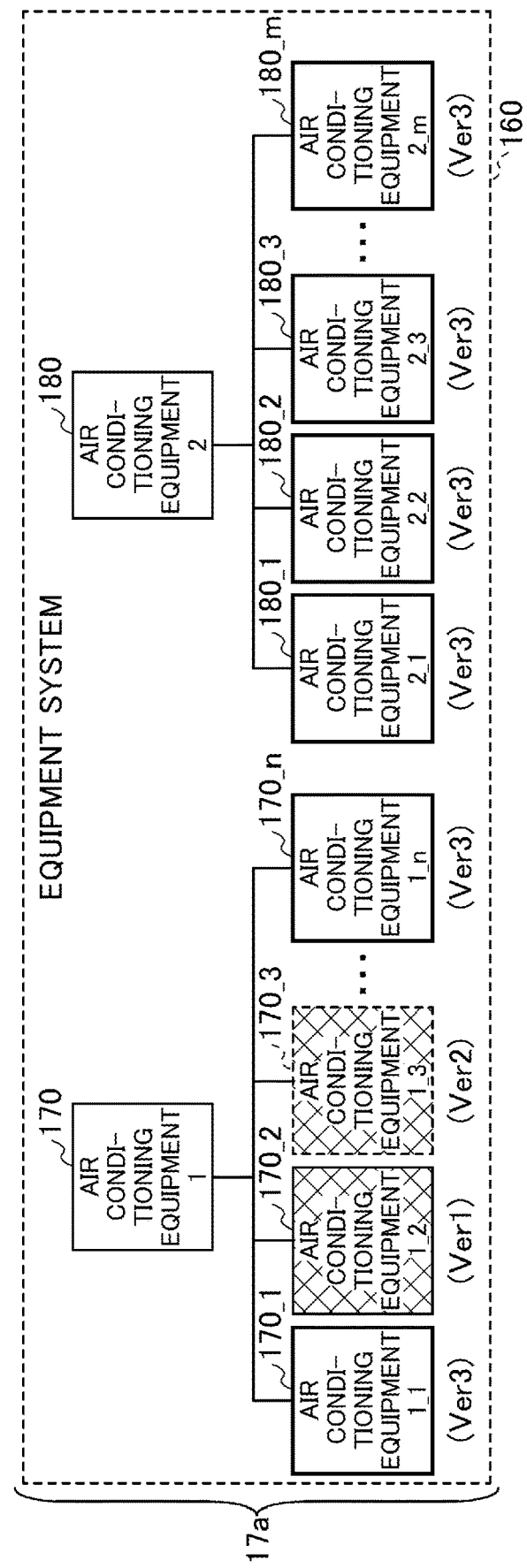
FIG. 17 is a fourth diagram illustrating a state transition of each air conditioning equipment in a software updating process.

In this case, the processing is executed in the order of NO in step S903 of FIG. 9, step S904 to step S910, and the state transitions to 17a of FIG. 17. An example of 17a of FIG. 17 illustrates a seventh state of each of the plurality of air conditioning equipment constituting the equipment system 160. As illustrated in 17a of FIG. 17, in the second refrigerant system, the air conditioning equipment 2_3 (reference numeral 180_3) is switched to the updated software, and the version is updated to "Ver3" (refer to the thick line).

<Summary>

As is clear from the above description, the software updating system 100 according to the first embodiment includes the plurality of air conditioning equipment constituting the equipment system, the controller that controls the plurality of air conditioning equipment, and the equipment management device that is communicably connected to the controller. The non-target equipment management unit 122 acquires equipment information indicating the operation state of at least each update target equipment among the plurality of air conditioning equipment. The communication state detection unit 142 acquires the information indicating the reception state of updated software of the plurality of air conditioning equipment. The switching management unit 124 determines whether switching to the updated software by each air conditioning equipment is to be performed. The switching process unit 144 instructs switching to the updated software based on the result of the determination by the switching management unit 124. When there is an air conditioning equipment that is in operation (not listed in the non-target equipment list) and from which reception is incomplete (i.e., the reception completion notification has not been received), the switching management unit 124 determines that switching to the updated software by the air conditioning equipment is not performed.

As described above, in the case of the first embodiment, switching to the updated software by each air conditioning equipment is not performed in a situation in which there is an air conditioning equipment that is in operation (not listed in the non-target equipment list) and from which reception is incomplete (i.e., the reception completion notification has not been received). As a result, it is possible to avoid a situation where different versions of software are executed between the air conditioning equipment in operation.

Further, in the software updating system 100 according to the first embodiment, the switching management unit 124 determines to perform switching to the updated software by the air conditioning equipment other than the relevant air conditioning equipment among the air conditioning equipment when an air conditioning equipment that is not in operation exists.

As described above, in the case of the first embodiment, in a situation where there is an air conditioning equipment that is not in operation (listed in the non-target equipment list), switching to the updated software is performed for an air conditioning equipment (target equipment in operation) other than the air conditioning equipment that is not in operation. As a result, it is possible to avoid a situation in which the software of the air conditioning equipment in operation is not updated for a long period of time.

That is, according to the first embodiment, when the software is collectively updated for the plurality of equipment items constituting the equipment system, it is possible to implement the update processing according to the situation of each air conditioning equipment.

Other Embodiments

In the above-described first embodiment, the equipment management device 120 and the controller 140 are configured as separate bodies, but the equipment management device 120 and the controller 140 may be configured as an integrated body. That is, the non-target equipment updating unit 141 to the switching process unit 144 implemented in the controller 140 may be implemented in the equipment management device 120. Alternatively, the equipment list management unit 121 to the switching management unit 124 may be implemented in the controller 140. In any case, the software updating program including the equipment management program and the control program will be executed on the integrally configured equipment.

In the first embodiment, the administrator 131 who manages the plurality of air conditioning equipment constituting the equipment system 160 permits the update of the software. However, a person other than the administrator 131 (for example, an owner of a building where the equipment system 160 is installed) may grant the permission.

Further, in the first embodiment, the air conditioning equipment whose software is to be collectively updated is set as an update target, and the software is collectively updated in units of refrigerant systems. However, the collective update of the software may be performed in units other than the refrigerant system.

Although a description has been given of the embodiments, it may be understood that various modifications may be made to the configurations and details thereof, without departing from the subject matter and scope of the claims.

This application is based on and claims priority to Japanese Patent Application No. 2020-080709 filed on Apr. 30, 2020, the entire contents of which are hereby incorporated by reference.

DESCRIPTION OF SYMBOLS 100 software updating system
110 updated software providing device
120 equipment management device
121 equipment list management unit
122 non-target equipment management unit
123 software management unit
124 switching management unit
130 input device
140 controller
141 non-target equipment updating unit
142 communication state detection unit
143 version transmission unit
144 switching process unit
160 equipment system
300 equipment list
310 non-target equipment list
400 version information

The invention claimed is:

1. A software updating method for a plurality of equipment constituting an equipment system, the software updating method comprising:
acquiring information indicating an operation state of at least respective equipment to be updated among the plurality of equipment;
acquiring information indicating a reception state of updated software for the respective equipment;
identifying, based on the information indicating the operation state and the information indicating the reception state, equipment that is not in operation among the respective equipment,
determining whether to perform switching to the updated software by the respective equipment, except for the equipment being identified as not in operation; and
instructing switching to the updated software based on a result of the determining,
wherein the determining determines that the switching to the updated software by the respective equipment is not to be performed in a case where the respective equipment is identified as being in operation among the respective equipment, but is in an incomplete reception state of updated software.

2. The software updating method according to claim 1, wherein the information indicating the operation state of the respective equipment includes at least one of user setting in and information indicating a driving state of equipment.

3. The software updating method according to claim 1, further comprising:
acquiring, in a case where the equipment, among the respective equipment, is identified as not in operation becomes in operation, a current version of software for the equipment,
comparing the acquired current version With a version of the updated software;
transmitting, to the equipment that has become in operation, the updated software, in a case where the acquired current version satisfies a condition as a result of the comparing; and
instructing switching to the updated software after the equipment that has become in operation successfully received the updated software.

4. The software updating method according to claim 1, the method further comprising retransmitting the updated software to equipment from which reception has failed, among the equipment identified as being in operation and from which reception is incomplete.

5. The software updating method according to claim 4, wherein the information indicating the reception state of the updated software of the respective equipment includes information indicating that a reception failure state has continued for a predetermined period of time with respect to equipment identified as being in operation and from which reception has failed.

6. The software updating method according to claim 1, wherein the equipment system is an air conditioning system including an outdoor unit and an indoor unit.

7. A software updating system, including a plurality of equipment constituting an equipment system, a controller that controls the plurality of equipment, and a management device communicably connected to the controller, for updating software of the plurality of equipment constituting the equipment system, the management device comprising a memory, and a processor coupled to the memory and configured to:
acquire information indicating an operation state of at least respective equipment to be updated among the plurality of equipment;
acquire information, indicating a reception state of updated software for the respective equipment;
identify, based on the information indicating the operation state and the information indicating the reception state, the equipment that is not in operation among the equipment,
determine whether to perform switching to the updated software by the respective equipment, except for the equipment being identified as not in operation; and
instruct switching to the updated software based on a result of the determination,
wherein the processor is configured to determine that the switching to the updated software by the respective equipment is not to be performed in a case where the equipment is identified as being in operation among the respective equipment, but is in an incomplete reception state of updated software.

8. A software updating system, including a plurality of equipment constituting an equipment system and a management device that manages the plurality of equipment, for updating software of the plurality of equipment constituting the equipment system, the management device comprising a memory, and a processor coupled to the memory and configured to:
acquire information indicating an operation state of at least respective equipment to be updated among the plurality of equipment;
acquire information indicating a reception state of updated software for the respective equipment;
identify, based on the information indicating the operation state and the information indicating the reception state, equipment that is not in operation among the respective equipment,
determine whether to perform switching to the updated software by the respective equipment, except for the equipment being identified as not in operation; and
instruct switching to the updated software based on a result of the determination, wherein the processor is configured to determine that the switching to the updated software by the respective equipment is not to be performed in a case where the equipment is identified as being in operation among the respective equipment, but is in an incomplete reception state of updated software.

* * * * *